(12) United States Patent
Bronskill et al.

(10) Patent No.: US 7,158,138 B1
(45) Date of Patent: *Jan. 2, 2007

(54) SYSTEM AND METHOD FOR DRAWING AND PAINTING WITH WARPED BITMAP BRUSHES

(75) Inventors: John Bronskill, Bellevue, WA (US); Michel Gangnet, Saint Germain (FR)

(73) Assignee: Microsoft Corporation, Redmond, WA (US)

( * ) Notice: Subject to any disclaimer, the term of this patent is extended or adjusted under 35 U.S.C. 154(b) by 430 days.

This patent is subject to a terminal disclaimer.

(21) Appl. No.: 09/602,044

(22) Filed: Jun. 23, 2000

Related U.S. Application Data

(63) Continuation-in-part of application No. 09/224,237, filed on Dec. 30, 1998, now Pat. No. 6,201,549.

(51) Int. Cl.
*G06T 11/20* (2006.01)

(52) U.S. Cl. ...................... 345/441; 345/442

(58) Field of Classification Search ............... 345/440, 345/441, 442, 593, 419, 582, 676, 646, 647; 382/282, 203
See application file for complete search history.

(56) References Cited

U.S. PATENT DOCUMENTS

| | | | |
|---|---|---|---|
| 4,774,516 A | 9/1988 | Henri et al. | |
| 4,897,638 A | 1/1990 | Kokunishi et al. | |
| 4,952,051 A | 8/1990 | Lovell et al. | |
| 5,155,813 A | 10/1992 | Donoghue et al. | |
| 5,216,755 A | 6/1993 | Walker et al. | |
| 5,276,787 A | 1/1994 | Searby | |
| 5,361,333 A | 11/1994 | Ahlquist, Jr. et al. | |
| 5,432,896 A | 7/1995 | Hwong et al. | |
| 5,488,204 A | 1/1996 | Mead et al. | |
| 5,506,603 A | 4/1996 | Kawano et al. | |
| 5,548,706 A | 8/1996 | Koizumi et al. | |
| 5,615,321 A | 3/1997 | Corn | |
| 5,687,304 A * | 11/1997 | Kiss | 345/419 |
| 5,717,845 A * | 2/1998 | Patrick et al. | 345/676 |
| 5,767,860 A | 6/1998 | Zimmer et al. | |
| 5,835,086 A * | 11/1998 | Bradstreet et al. | 345/581 |
| 5,847,712 A | 12/1998 | Salesin et al. | |
| 6,037,948 A * | 3/2000 | Liepa | 345/582 |
| 6,064,388 A | 5/2000 | Reyzin | |
| 6,097,853 A * | 8/2000 | Gu et al. | 382/282 |

(Continued)

OTHER PUBLICATIONS

Hsu, Siu Chi et al. "Drawing and Animation Using Skeletal Strokes", *Computer Graphics Proceedings, Annual Conference Series*, 1994, ACM, Jul. 1994, pp. 109-118.

(Continued)

*Primary Examiner*—Jeffery A. Brier
(74) *Attorney, Agent, or Firm*—Shook, Hardy & Bacon L.L.P.

(57) ABSTRACT

A system and method is described for rendering a warped brush stroke using a bitmap brush image, the brush stroke being along a arbitrarily curved guideline. The described system and method generate a piecewise linear approximation to the guideline followed by generating polygons with the aid of the linear segments such that the generated polygons are convex and contiguous linear segments result in contiguous polygons. A mapping is identified between segments of the bitmap brush and the polygons such that the corners or the boundaries of the segments of a segment map to the corners or boundaries of a corresponding polygon. The segment of the bitmap brush is mapped into the corresponding polygon using transformations that do not require visiting a pixel in the rendered warped brush stroke more than once. Examples of such transformations include bilinear transformations and texture mapping in combination with tiling.

39 Claims, 25 Drawing Sheets

U.S. PATENT DOCUMENTS

| | | | | |
|---|---|---|---|---|
| 6,173,075 | B1* | 1/2001 | Collins | 382/203 |
| 6,201,549 | B1* | 3/2001 | Bronskill | 345/441 |
| 6,268,865 | B1* | 7/2001 | Daniels et al. | 345/582 |
| 6,639,593 | B1* | 10/2003 | Yhann | 345/419 |

OTHER PUBLICATIONS

Hsu, Siu Chi et al., "Skeletal Strokes", *UIST'93 Proceedings of the ACG SIGGRAPH and SIGCHI Symposium on User Interface Software and Technology*, ACM, Nov. 1993.

Foley J. et al. *Computer Graphics Principles and Practice 2nd Edition*, Chapter 11.2 "Parametric Cubic Curves", Addison-Wesley, 1990, pp. 478-491.

Schneider, Philip J., "Solving the Nearest-Point-on-Curve Problem" in *Graphics Gems* (A. Glassner ed.), Academic Press, Inc., 1990.

Rosenfeld A., et al. *Digital Picture Processing, vol. 2*, Chapter 9.3 "Geographic Transformation", Academic Press, 1982, pp. 31-36.

Schmacher, D., "General Filtered Image Rescaling", in *Graphics Gems III* (D. Kirk ed.), Academic Press Inc., 1992, pp. 8-16, 414-424.

Farin, G., *Curves and Surfaces for CAGD—A Practical Guide, 4th Edition*, Academic Press, 1992.

Porter T., et al. "Compositing Digital Images", *Computer Graphics*, vol. 18, No. 3, Jul. 1984, pp. 49-55.

* cited by examiner

SYSTEM AND METHOD FOR DRAWING AND PAINTING WITH WARPED BITMAP BRUSHES

RELATED APPLICATIONS

This is a continuation in part of copending application(s) Ser. No. 09/224,237, filed on Dec. 30, 1998 now U.S. Pat. No. 6,201,549.

TECHNICAL FIELD

This invention relates generally to displaying art and information in computing environment and, more particularly, relates to rendering graphic output along a curving baseline defining a stroke path.

BACKGROUND OF THE INVENTION

Since the first incarnation of digital paint systems, there has been a lot of work to make synthesized paint strokes, i.e., virtual painting on a computer, look like those created using traditional paint and drawing tools, for example, watercolor brushes, chalk strokes, etc. In particular, two known commercial products, "PAINTER" an "EXPRESSION" sold by MetaCreations, provide tools for use in creating "natural media" digital painting and drawing. "PAINTER" is raster based and uses procedural algorithms to generate paint strokes that give the appearance that they have been created by their real world counterpart. "EXPRESSION" is vector based and uses "skeletal strokes" technology.

Skeletal strokes, described in S. C. Hsu and I. H. H. Lee, "*Drawing and Animation Using Skeletal Strokes*," SIGGRAPH '94 Conference Proceedings, July 1994 and S. C. Hsu, I. H. H. Lee, and N. E. Wiseman, "*Skeletal Strokes*," UIST '93 Proceedings of the ACM SIGGRAPH and SIGCHI Symposium on User Interface Software Technology, November 1993, utilizes a vector graphics realization of the brush and stroke metaphor using arbitrary pictures as "ink." Generally, defining a skeletal stroke requires drawing an instance of the flesh, which could be any arbitrary picture, around a reference line. The reference line provides a reference x-axis for the points specifying the position of the flesh; a reference thickness provides a scale to specify the lateral distance of these points from the reference line. A picture so anchored to a single reference line defines a skeletal stroke. Once a skeletal stroke is defined, it can be applied along any arbitrary path by simply drawing the path and aligning the reference line of the skeletal stroke with the given path. In this manner, the flesh is distorted (stretched, compressed, bent and/or sheared) to generally follow the path.

It should be noted that it is possible to distort or warp images without reference to a specified reference line. As an example, the U.S. Pat. No. 5,920,327 issued to Robert Seidensticker, Jr., describes rendering graphical objects at different resolutions within the same image to generate a 'fish-eye' view. It does not, however, teach techniques for rendering graphics relative to arbitrarily curved baselines or other reference lines.

While these tools generally work for their intended purpose, both "PAINTER" and "EXPRESSION" tend to fall short in terms of the realism of the paint stroke synthesized. In particular, because of the procedural nature of "PAINTER" and the vector nature of "EXPRESSION", the paint strokes produced lack the subtle flaws and detail of real brush strokes or real objects. Accordingly, a need exists for an apparatus and method for digitally producing brush strokes that appear to be hand drawn and painted. It is also desirable to reduce the computational effort in providing such functionality in order to provide responsive applications that can be executed on a broad range of systems (as opposed to high end computing machines).

In many embodiments the paint brush may be specified by a bitmap, termed a bitmap brush that can be treated as a two-dimensional object. Two-dimensional graphical objects are customarily transformed using affine transformations, such as scaling, rotating, skewing, and translating. In addition, non-affine transformations, such as texture mapping, bilinear and perspective transforms, are available that can actually "warp" the graphical object. For instance, in a bilinear transform, a rectangle is transformed into a "quad," i.e., a quadrilateral, such that any point along the edge of the rectangle becomes a point on the edge of the quad while retaining its relative position. Points within the rectangle are similarly distorted or warped in their relative positions. It is convenient to regard bilinear transforms as preserving equally spaced points along a line but not necessarily preserving diagonal straight lines as straight lines.

A brush stroke can be imagined to be along a path connecting two endpoints. Such a path may be imagined to have a width and a curvature, including sharp turns. The width may be constant or it may vary in a prescribed manner, e.g., as a function of the local curvature or some other rule. The brush itself may be an image to be warped or a set of tiles to be arranged along the path prescribed by a guideline, which includes information about the path and the thickness of the desired brush stroke.

SUMMARY OF THE INVENTION

The invention describes a method and system for rendering a warped brush stroke using a bitmap brush image, the brush stroke being along a arbitrarily curved guideline. The method and system generate a piecewise linear approximation, consisting of linear segments, to the guideline followed by generating convex polygons with the aid of the linear segments such that contiguous linear segments have contiguous polygons. A mapping is identified between segments of the bitmap brush and the polygons such that the corners or the boundaries of a segment of the bitmap brush map to the corners or boundaries of a corresponding polygon. The collection of polygons, so rendered, define the warped brush stroke.

Specifically, a segment of the bitmap brush is mapped into a corresponding polygon using transformations that do not require visiting any pixel in the warped brush stroke more than once. Examples of such transformations include the bilinear transformation, which defines a mapping between a bitmap brush segment having four corners and a polygon in the warped brush stroke having four corners. Thus, this is a mapping between quads where quads include squares, rectangles and quadrilaterals. Another useful transformation—more general than the bilinear transformation—is texture mapping, which allows mapping between polygons having different number of corners. In addition, tiling, using one or more segments of the bitmap brush, may be used to preserve sufficient detail in the warped brush stroke while allowing rendering of an extended warped brush stroke.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
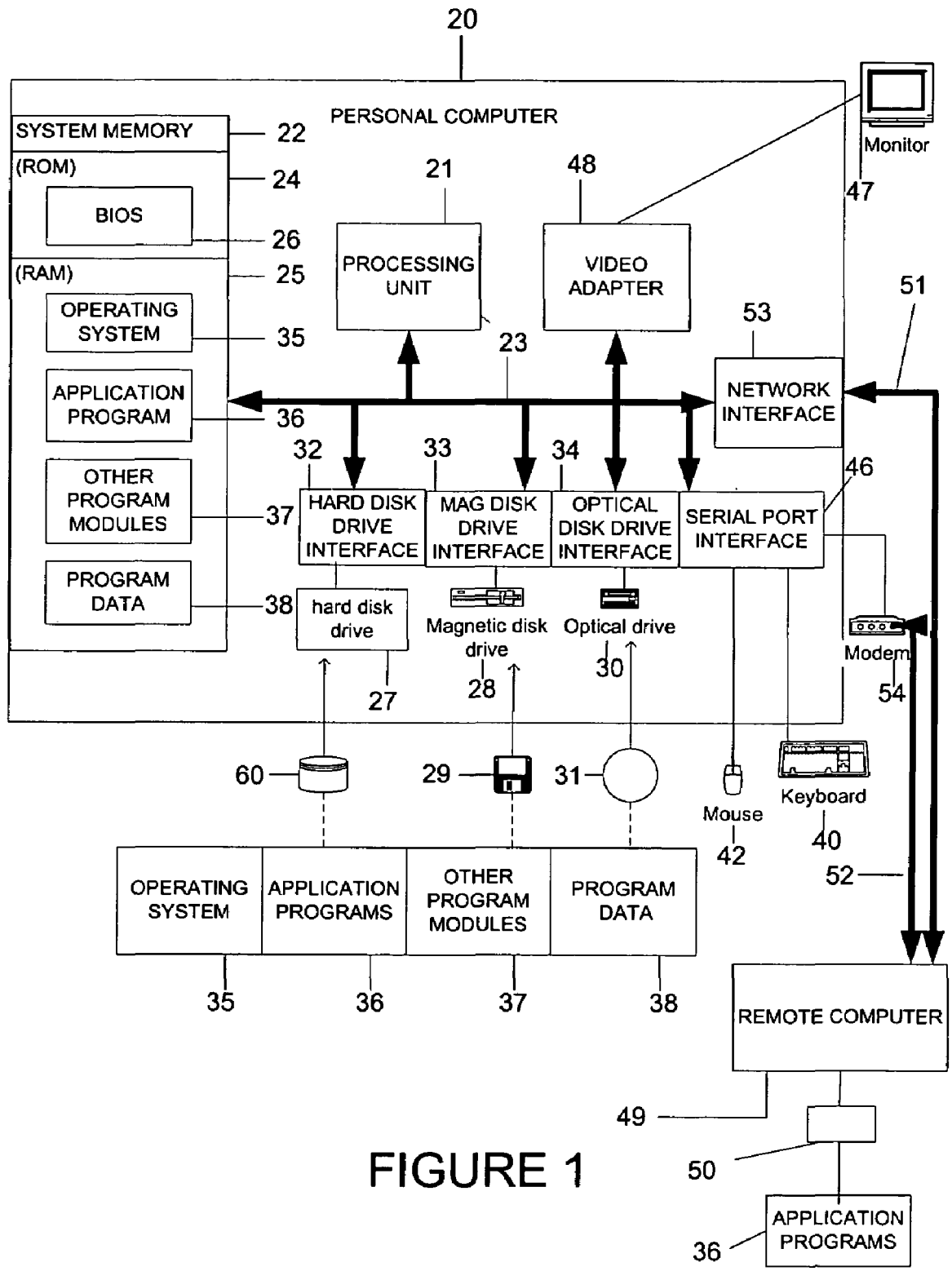
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed in a computing environment. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computing environment 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing environment 20, such as during start-up, is stored in ROM 24. The computing environment 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computing environment 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

Computing environment 20 includes computer readable media includes volatile and nonvolatile, removable and non-removable media implemented in any technology or method for information storage such as computer instructions, data structures, program modules and the like. Computer storage media includes, but is not limited to, RAM, ROM, EEPROM, flash memory, or other memory technology, CD-ROM, Digital versatile disks ("DVD") etc. that can be used to store and access the information. Communication media typically includes computer readable instructions, data structures, program modules or data in a modulated data signal such as a carrier wave.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The computing environment 20 may operate in a networked environment using logical connections to one or more remote computers, such as a remote computer 49. The remote computer 49 may be a personal computer, a server, a router, a network PC, a peer device or other common network node, and typically includes many or all of the elements described above relative to the computing environment 20, although only a memory storage device 50 has been illustrated in FIG. 1. The logical connections depicted in FIG. 1 include a local area network (LAN) 51 and a vide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the computing environment 20 typically includes a modem 54 or other means for establishing communications over the WAN 52. The modem 54, which may be internal or external, is connected to the system bus 23 via the serial port interface 46. In a networked environment, program modules depicted relative to the computing environment 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
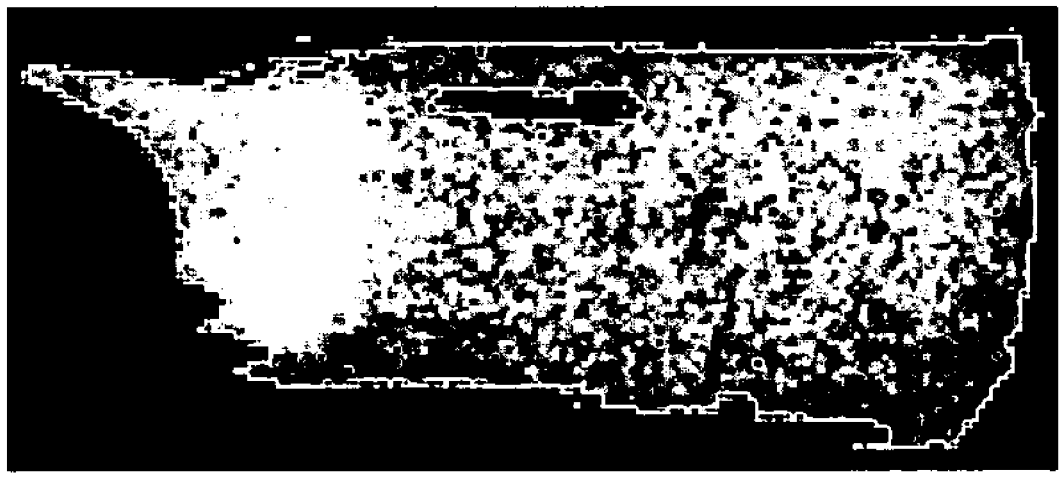
FIG. 2 is an illustration of a "sumi-e" bitmap brush.
Figure 3:
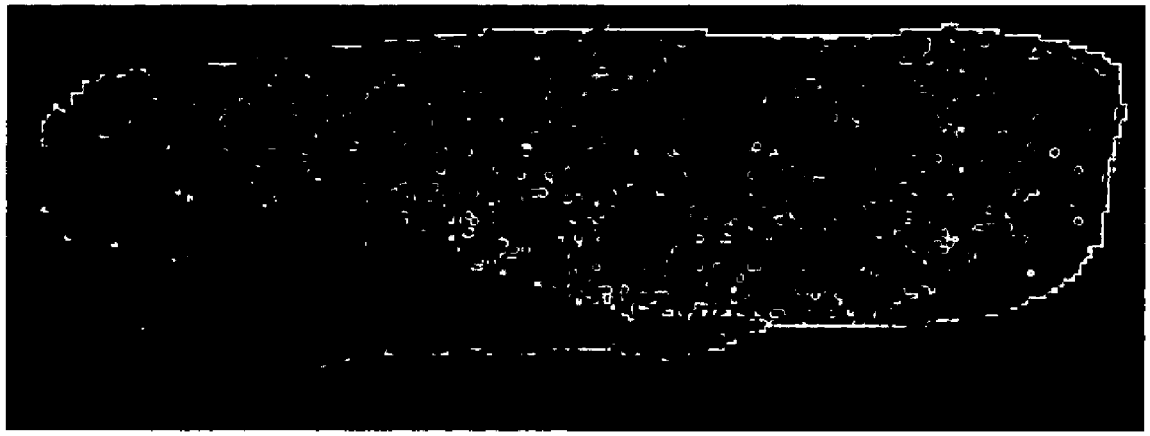
FIG. 3 is an illustration of a "watercolor" bitmap brush.
Figure 4:
FIG. 4 is an illustration of a "chain" bitmap brush.
Figure 5:
FIG. 5 is an illustration of a "rope" bitmap brush.

In accordance with the invention, a system and method is provided for allowing a user to paint and draw with a scanned bitmap brush. To create the paint stroke, the bitmap brush is mapped to and warped along the path of a predefined guideline stroke. The bitmap brush may be an "artistic brush" that is a scanned bitmap image of an actual artistic stroke created in a variety of styles including watercolor, oil, chalk, crayon, ink, etc. An exemplary "sumi-e" bitmap brush is illustrated in FIG. 2 while an exemplary "watercolor" bitmap brush is illustrated in FIG. 3. Additionally, the bitmap brush may be a "photo brush" that is a scanned bitmap image of an object such as a rope, wire, chain etc. An exemplary "chain" bitmap brush is illustrated in FIG. 4 while an exemplary "rope" bitmap brush is illustrated in FIG. 5. While it is preferred that the bitmap brushes be created using well known scanning processes, it will be appreciated that other known methods are available for creating the bitmap brush images. Accordingly, the invention is not intended to be limited to any particular manner by which the bitmap brushes are created.

The predefined guideline over which the bitmap brushes are mapped to create the artistic stroke can be drawn using any currently available, digital painting tool, be extracted from provided clip art images, etc. Additionally, the predefined guideline can be of any thickness and include any number of curves. While the height of the bitmap brush is a constant in many of the embodiments it is possible to vary the thickness of the brush stroke. For instance, use of an input, e.g., pressure, to vary the thickness of the brush stroke at a particular point along the brush stroke allows generation of a pair of lines defining the thickness of the brush. From another perspective, this may be treated as specifying a desired height/thickness for the warped stroke at selected points along the guideline. In embodiments where the brush stroke is specified algebraically such a specification could reflect a desired pressure profile. A simple example may have two lines, not necessarily parallel to each other, in the guideline to specify the upper and lower edges of the warped stroke made using the bitmap brush. Accordingly, the invention is not intended to be limited to any particular manner by which the predefined guideline is created or the height/thickness of the brush stroke specified.

Figure 6:
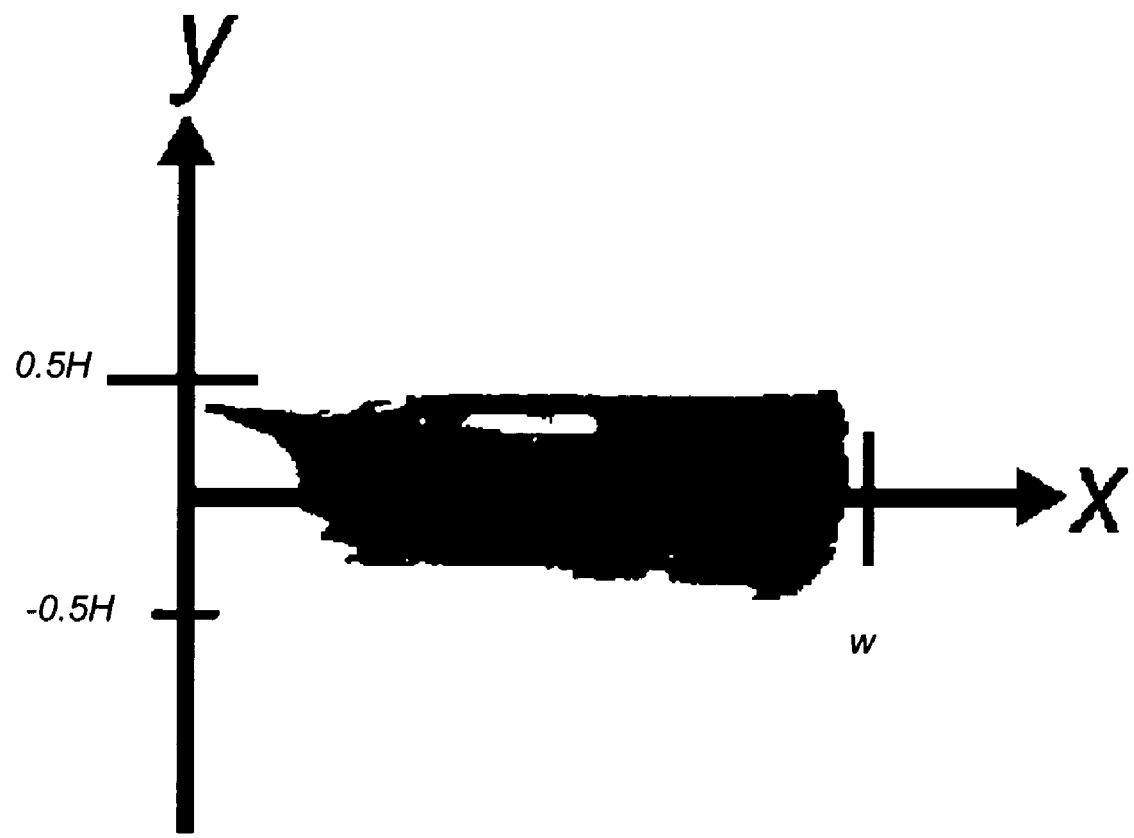
FIG. 6 is an illustration of the "sumi-e" bitmap brush of FIG. 2 disposed in a Cartesian coordinate system.
Figure 7:
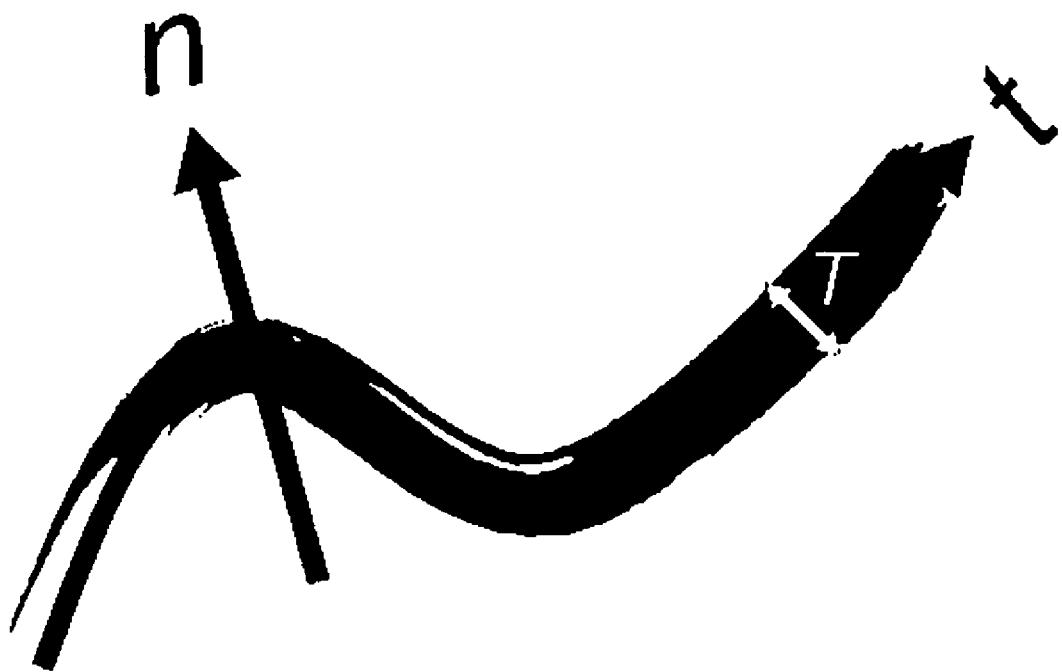
FIG. 7 is an illustration of the "sumi-e" bitmap brush of FIG. 2 warped along a guideline specifying a constant thickness continuous brush stroke.

The mapping and warping of the generally rectangular bitmap brush along the predefined guideline to create the paint stroke is generally accomplished by transforming the Cartesian (x, y) coordinate system of the bitmap brush such that the x-axis of the bitmap brush is aligned with the path Q(t) of the guideline and the y-axis of the bitmap brush is aligned with the instantaneous normal n to the path Q(t) of the guideline. The pre-transformation coordinate system for a "sumi-e" bitmap brush having a width in pixels W and a height in pixels H is illustrated in FIG. 6. The transformed "sumi-e" bitmap brush that has been warped along the guideline having a width in pixels T to create a paint stroke is illustrated in FIG. 7. As seen in FIG. 7, the instantaneous normal n is perpendicular to the path Q(t) of the guideline at each point $P_t$ that comprises the path Q(t). An exemplary method by which such a coordinate transformation may be performed is described in S. C. Hsu, I. H. H. Lee, and N. E. Wiseman, "*Skeletal Strokes*," USIT '93 Proceedings of the ACM SIGGRAPH and SIGCHI Symposium on User Interface Software and Technology, November 1993.

Figure 8:
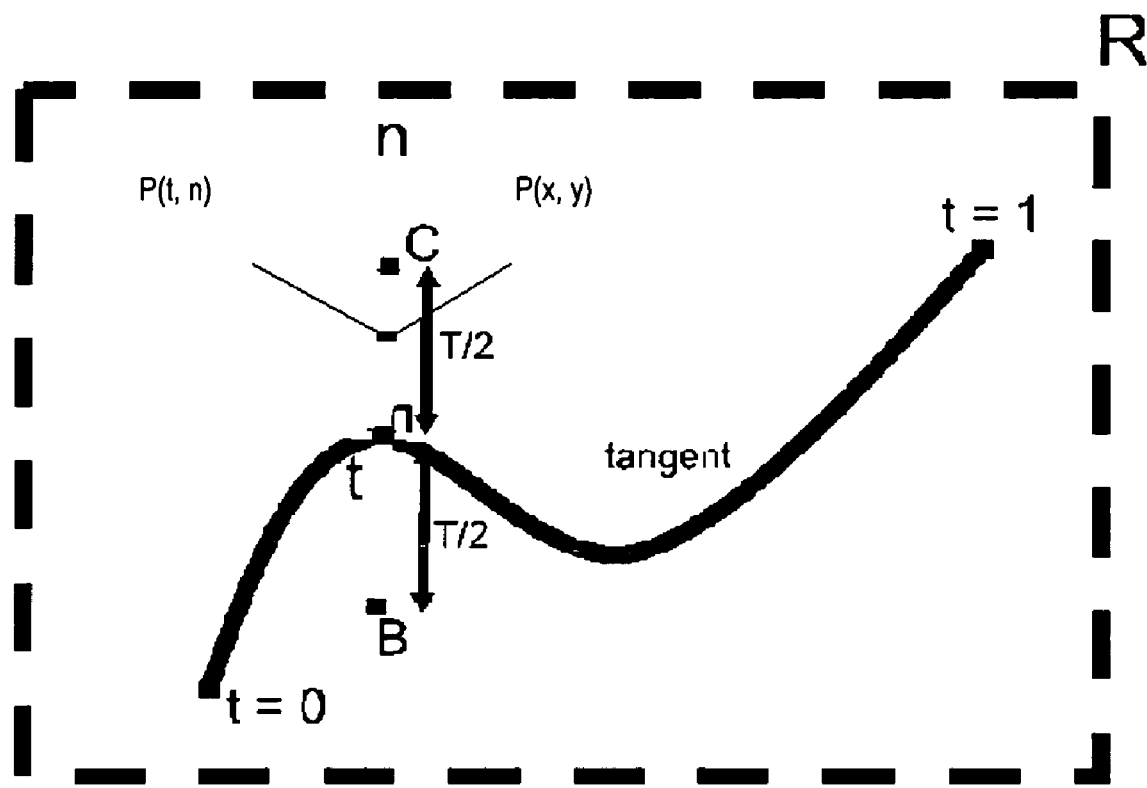
FIG. 8 is a graphical representation of a forward approach to mapping a bitmap brush image to a guideline.

More specifically, to map and warp the bitmap brush to the two dimensional continuous curves of the guideline, the path Q(t)={x(t),y(t)} of the guideline is first expressed in parametric form with parameter t ($0 \leq t \leq 1$) such that the start of the path Q(t) is at t=0 and the end of the path Q(t) is at t=1. This is illustrated in FIG. 8. A method for expressing the path Q(t) of a guideline in parametric form is described in greater detail in J. Foley, A. Van Dam, S. Feiner, and J. Hughes, "*Computer Graphics Principles and Practice,*" $2^{nd}$ Edition, Addison-Wesley, 1990. Preferably, each guideline has a continuous first derivative $Q'(t)=\{x'(t),y'(t)\}$ and second derivative $Q''(t)=\{x''(t),y''(t)\}$. Details pertaining to the calculation of the derivatives and the like are described in G. Farin, "*Curves and Surfaces for CAGD—A Practical Guide,*" $4^{th}$ Edition, Academic Press, 1997. A familiar example of such a guideline is a two-dimensional cubic Bezier curve. It should be noted that a guideline having a continuous first derivative is not a requirement, but instead, a preference in some embodiments.

Figure 9:
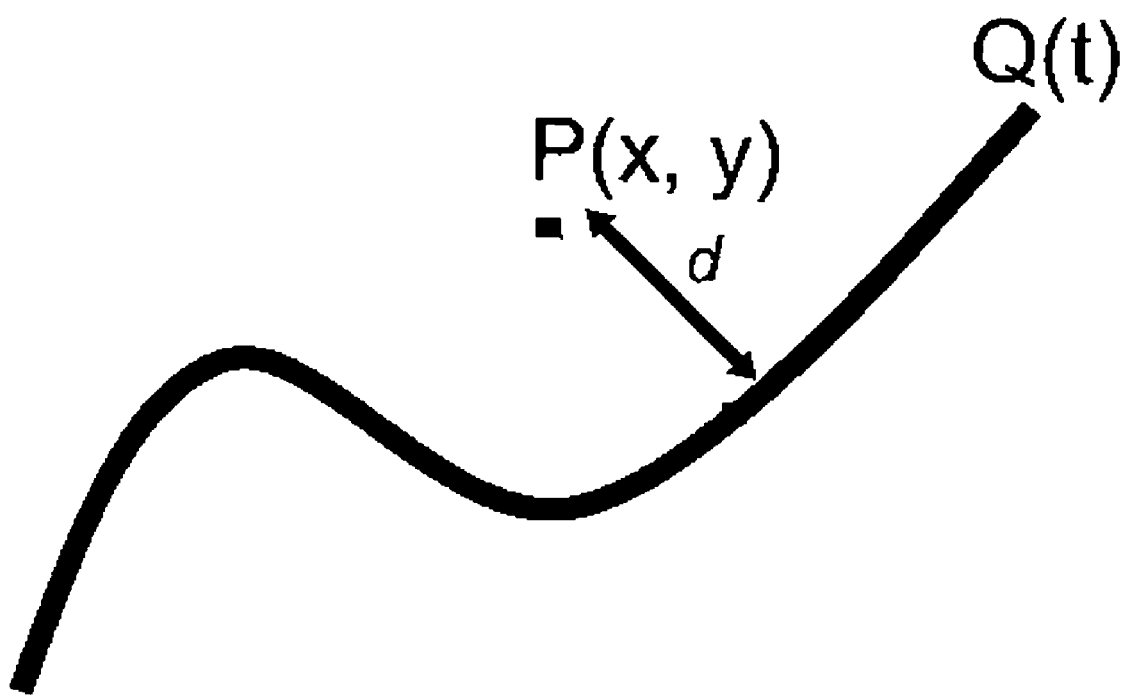
FIG. 9 is an illustration of the graphical representation of a point in the guideline in the Cartesian coordinate system.

Having defined the path Q(t) of the guideline in parametric form, the points $P_{t,n}$ that comprise the predefined guideline are defined. Letting W and H be the width and height of the bitmap brush in pixels, respectively, L be the arc length of the path Q(t) of the guideline in pixels, T be the thickness of the guideline in pixels, and R be a rectangular region that fully encloses the path Q(t) if it is drawn with a stroke thickness T, a point $P_{t,n}$ on the guideline a distance d from Q(t) can be defined by the expression:

$$P(x,y)=Q(t)+d\hat{n}(t) \quad (1)$$

where $0 \leq t \leq 1$, $-T/2 \leq d \leq T/2$, and $\hat{n}(t)$ is the unit normal vector to Q(t). The graphical representation of this definition of a point of the guideline is illustrated in FIG. 9. Expanding the equation, it can be expressed as:

$$P(x,y)=(x(t),y(t))+d(y'(t),-x'(t))/\sqrt{x'^2(t)+y'^2(t)} \quad (2)$$

In this manner, each point $P_{t,n}$ that comprises the guideline can be mapped to a Cartesian coordinate location P(x,y) within the rectangle R.

Using the relationship between the points $P_{t,n}$ that define the guideline and the locations P(x,y) defining the rectangle, there are two alternative approaches that can be taken to complete the mapping of the pixels that comprise the bitmap brush to the points $P_{t,n}$ that comprise the guideline. Without any loss in generality these are described in the context of warped brush strokes of constant width and with only one line in the guideline. Generally, in the forward mapping approach, equation (2) is used and t and d are varied over all possible values. In the backward mapping approach, the point P(x,y) is started with and t and d are solved for known x(t), y(t), x'(t), and y'(t).

The bitmap brush pixel look-up is performed using the height (H pixels) and the width (W pixels) of the bitmap brush. It will be appreciated that the (X,Y) address of the pixel within the bitmap brush derived from the foregoing procedure may not be a integral value. As a result, interpolation techniques such as nearest neighbor, bilinear, bicubic convolution or other methods should be employed. Examples of such interpolation techniques may be found in A. Rosenfeld and A. Kak, "*Digital Picture Processing,*" Vol. 2, $2^{nd}$ Edition, Academic Press, 1982. Furthermore, to minimize distortion, it is preferred that the brush image should be scaled such that H is equal to T and W is equal to L. Known methods for performing these scaling operations are described in D. Schumacher, "*General Filtered Image Rescaling,*" Graphics Gems III (D. Kirk ed.), Academic Press, Inc. 1992.

An accumulation table into which the looked-up pixel values are stored is configured to have an entry in the form of an accumulation buffer for each point P(x,y) in the rectangle R. Upon completion of the accumulation process for all values t and n, the values for the pixels stored in the accumulation table are mapped to the corresponding P(x,y) location within the rectangle R to create the paint stroke. It will be understood that the pixels corresponding to the guideline are removed from the rectangle R during this mapping process.

Figure 10:
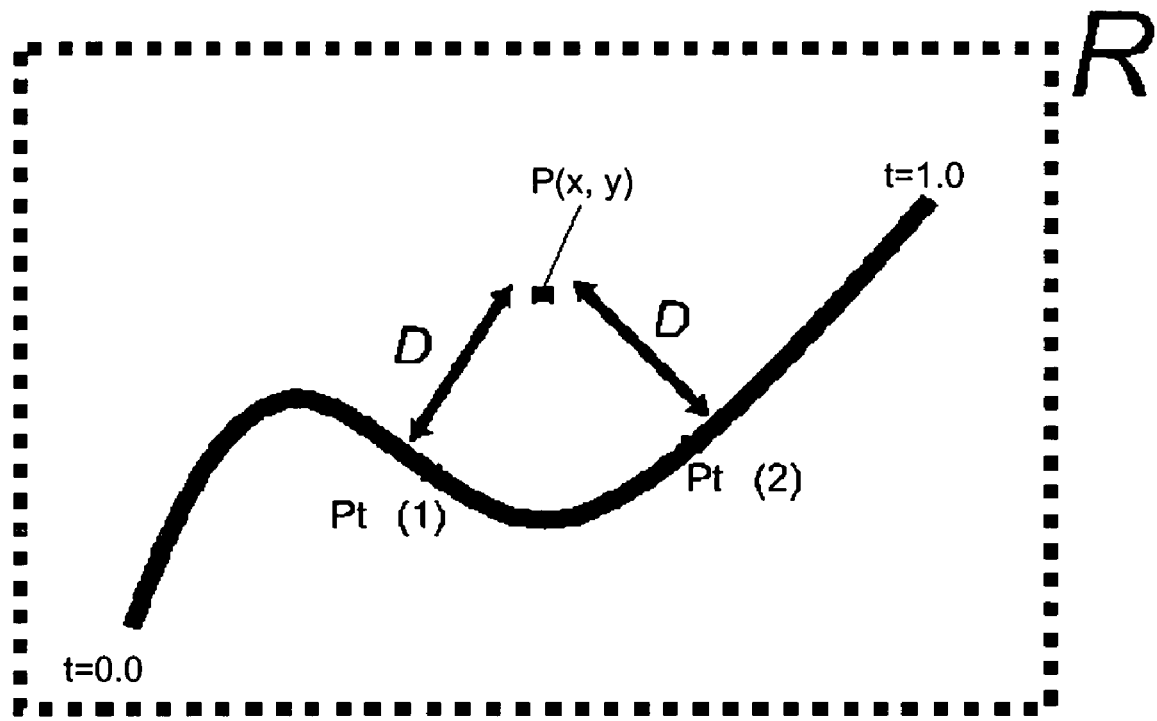
FIG. 10 is an illustration of a backward approach to mapping a bitmap brush image to a guideline.

In the backward mapping approach, illustrated in FIG. 10, for each pixel P(x,y) within the rectangle R points $Pt_x$ are computed from the points $P_t$ which comprise the path Q(t) that are nearest to P(x,y) in both Cartesian coordinates and parametric coordinates. An algorithm for performing this computation using Bezier curves may be found in P. J. Schneider, "*Solving the Nearest-Point-On-Curve-Problem,*" in Graphics Gems, Academic Press, 1990. Generally, for Bezier curves of degree three, there may be between zero and five points $Pt_x$ ($0 \leq x \leq 5$) on the path Q(t) that are nearest to P(x,y).

Unlike the backward mapping approach where each pixel P(x,y) is ensured of being assigned a pixel value, it is possible that the forward mapping approach may miss some pixels P(x,y) and hit some pixels P(x,y) more often then necessary. To minimize this result, the sample rates $\Delta t$ and $\Delta n$ are preferably set small enough such that substantially every pixel in the guideline stroke is hit but not so small that excessive work is being done. Accordingly, a nominal value for $\Delta t$ that is seen to be effective for relatively straight portions of the guideline path Q(t) is $\Delta t=1.0/(1.8*L)$.

As will be appreciated, however, this sample interval should be decreased as the radius of curvature of the guideline decreases. This results from the fact that the more the radius of curvature of the guideline decreases, the more the angles of the normals n for each point $P_t$ that comprise the curve will vary with respect to one another thus increasing the likelihood that pixels P(x,y) are missed or over sampled. A method for calculating the radius of curvature which can then be compared against a series of thresholds for adjusting the sampling rate $\Delta t$ may be found in G. Farin, "*Curves and Surfaces for CAGD—A Practical Guide,*" $4^{th}$ Edition, Academic Press, 1997. A preferred sample rate along the normal n is preferably set as $\Delta n=1.0/(1.3*T)$. Additionally, when the desired thickness T/2 exceeds the radius of curvature along any point $P_t$ on the path Q(t), unwanted visual artifacts may result. When this condition occurs in the forward mapping process, point B or C (depending on which side of the path Q(t) is concave) is preferably limited to the center of curvature of the path Q(t) for that point $P_t$.

In an alternative embodiment, instead of stretching or shrinking the entire length of the bitmap brush to substantially match the arc length of the guideline, it is possible to tile the bitmap brush in the x-direction. By way of example, given a guideline having an arc length of 400 pixels and a bitmap brush having a length of 200 pixels, it is possible to map the bitmap brush twice to the guideline (the bitmap brush being mapped once along the path Q(t) from $0 \leq t \leq 0.5$ and once again from $0.5 < t \leq 1.0$). To minimize distortion, it is again preferred that the brush image be scaled such that H is equal to T and W is equal to L/(the number of tiles desired). This method of mapping the bitmap brush is especially desirable for bitmap photo brushes, such as the "chain" bitmap brush illustrated in FIG. 4, whereby the number of links of the chain ultimately drawn will increase as a function of the length of the guideline. As will be appreciated, using the formerly described method of mapping the bitmap brush, wherein the bitmap brush is singularly mapped over the entire arc length of the guideline, would result in the rendering of a chain having the same number of chain links as are in the scanned "chain" bitmap brush image but would cause those chain links to lengthen as a function of the arc length of the guideline.

Figure 11:
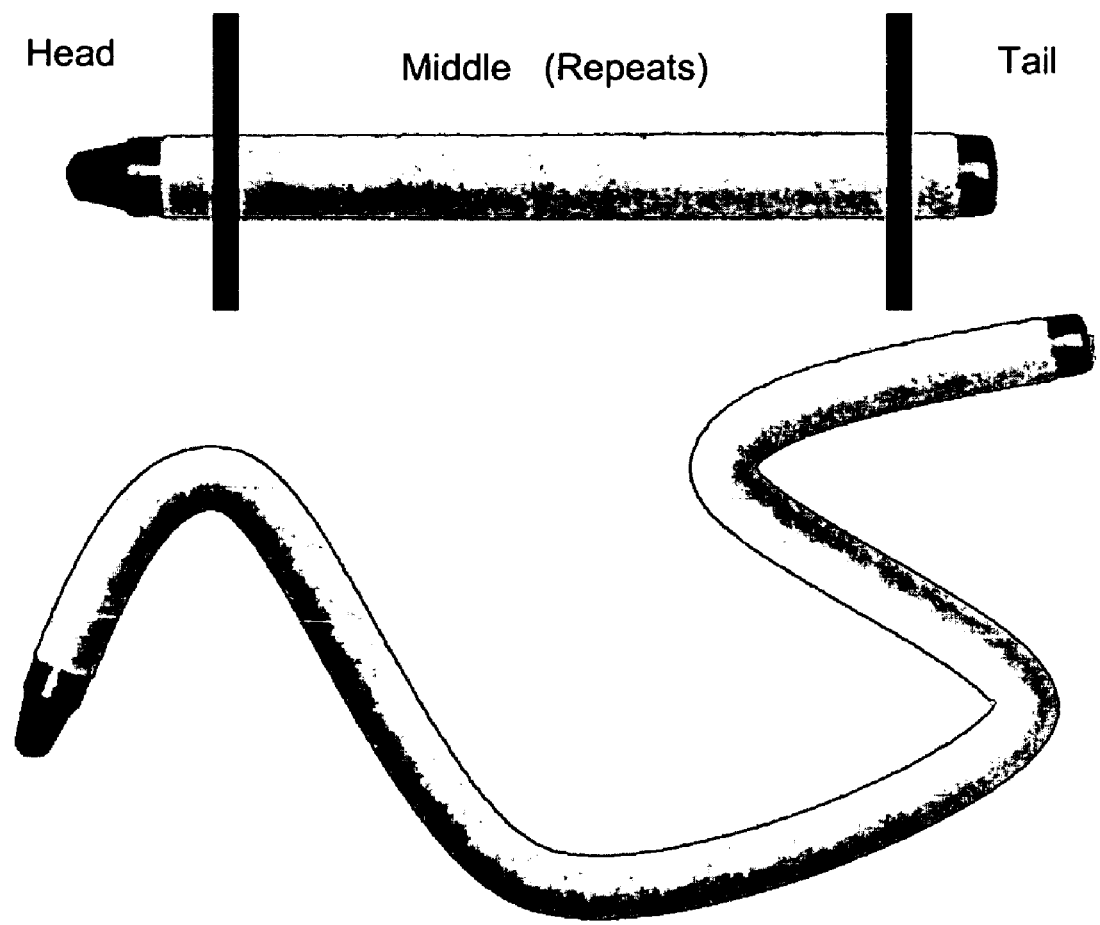
FIG. 11 is an illustration of a bitmap brush before and after being mapped to a guideline using a tiling method.

Still further, instead of mapping the entire length of the bitmap brush to the arc length of the guideline, it is possible to have a bitmap brush that has portions that tile in the x-direction. By way of example only, it is possible to have a bitmap brush, such as the "crayon" bitmap brush illustrated in FIG. 11, in which the middle section is tiled in the manner previously described while the head and tail sections are mapped to corresponding end portions of the path Q(t) such that the head and tail sections of the bitmap brush are stretched in the x-direction as little as possible when the paint stroke is completed while generally maintaining the overall proportions of the end sections. As will be apparent, this is particularly desirable for use in connection with bitmap brushes that have unique head and tail images, for example, the crayon illustrated in FIG. 11, a rope having tassels at either end, etc.

Figure 12:
FIG. 12 is an illustration of a warped brush stroke showing the compositing of paint strokes.

It is preferred that the pixels that comprise bitmap brush have color channels, such as RGB or CMYK, and, optionally, an alpha (transparency) channel. In this manner, both the forward and mapping approaches result in a warped image that can be composited onto any background image. This also allows multiple strokes to be drawn in a back to front manner by compositing one over another. An exemplary result of utilizing this method on clip art is illustrated in FIG. 12 wherein, it is preferred that, should any paths overlap, the algorithm selected is applied to each of the paths in a back to front manner so that the paths that are higher in the stacking order are composited over paths that are lower in the stacking order. An exemplary set of procedures for compositing digital images is provided in T Porter and T. Duff, "*Compositing Digital Images*," Proceedings of SIG-GRAPH, pages 253–259 in volume 84, 1984.

For guidelines that are formed from one or more pieces (normally cubic Bezier curve pieces) a test is preferably used to determine if the described mapping approaches should be applied to each piece individually or if the described mapping approaches should think of the guideline as having a single path Q(t). Specifically, if the end point of the $n^{th}$ piece is the same as the starting point of the $n+1^{th}$ piece and the normalized first derivative or normalized tangent vector evaluated at the end of the $n^{th}$ piece is equal to that at the start of the $n+1^{th}$ piece, then the $n^{th}$ and the $n+1^{th}$ pieces have sufficient continuity that is preferable to think of the pieces as a single continuous piece. If this test is not met, however, it is preferred to treat the pieces as discontinuous and separately map the bitmap brush to the $n^{th}$ piece and the $n+1^{th}$ piece. Alternatively, in the case of a discontinuity, it would be possible to "miter" or otherwise join together the discontinuous ends of the pieces such that a single continuous path Q(t) is formed. An approach for creating virtual continuous paths from discontinuous pieces is described in C. S. Hsu, I. H. H. Lee, and N. E. Wiseman, "*Skeletal Stokes*," UIST '93 Proceedings of the ACM SIG-GRAPH and SIGCHI Symposium on User Interface Software and Technology, November 1993. A further variation is to use discontinuous path segments to define a mapping, described subsequently, that generates warping brush effects with fewer calculations, and hence is significantly faster.

Figure 13:
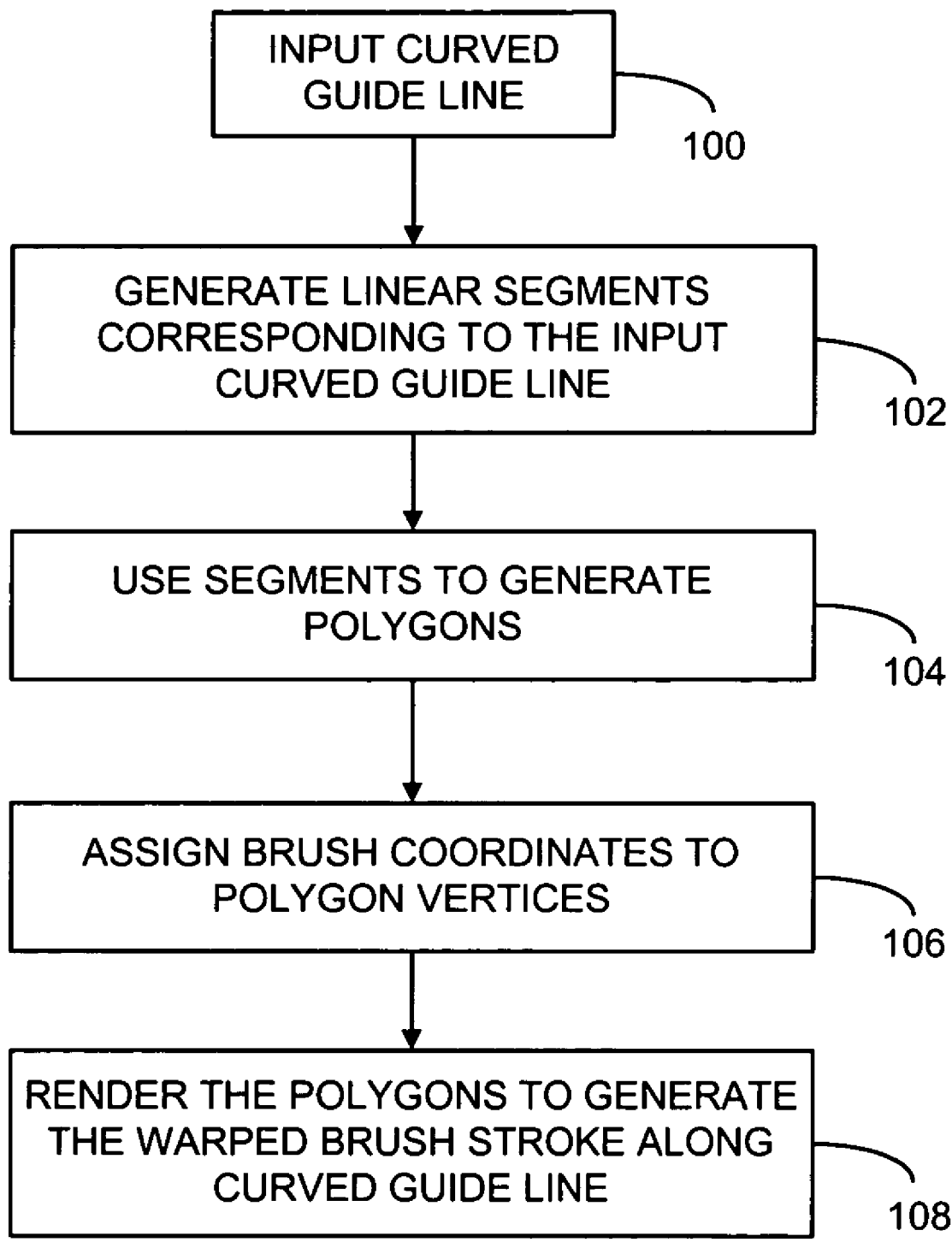
FIG. 13 is a flow chart listing broad outlines of a method for making a warped brush stroke without showing the compositing of paint strokes.

An alternative approach for painting with a bitmap brush that avoids visiting every pixel in the warped brush stroke more than once, and thus speeds up the underlying computations as much as ten-fold or more is illustrated in the flow chart in FIG. 13. A guideline along which a brush stroke is to be warped is inputted (step 100). This guideline could be derived from a piece of clip art or be specified by a formula, could be discontinuous in its slope but is preferably, continuous over its entire length. However, discontinuous guidelines comprising a finite number of continuous segments can also be used, e.g., by considering each continuous segment separately. A convenient method is to use a fraction of the bitmap image corresponding to each continuous segment in a discontinuous guideline. Other choices, such as using non-contiguous fractions of the bitmap image are also possible in alternative embodiments.

The guideline is modified to generate a set of linear line segments, i.e., with a large radius of curvature (step 102). If the guideline contains sharp bends, i.e. regions with sharp curvature or corners then one or more line segments are inserted to smooth out the sharp corner. An advantageous strategy is to examine the angle between normals to adjacent linear segments and flag a sharp corner in need of smoothing if the angle exceeds a threshold. Several strategies such as replacing the sharp corner with a miter join, a bevel or a round are used to handle such portions of the guideline.

Figure 14:
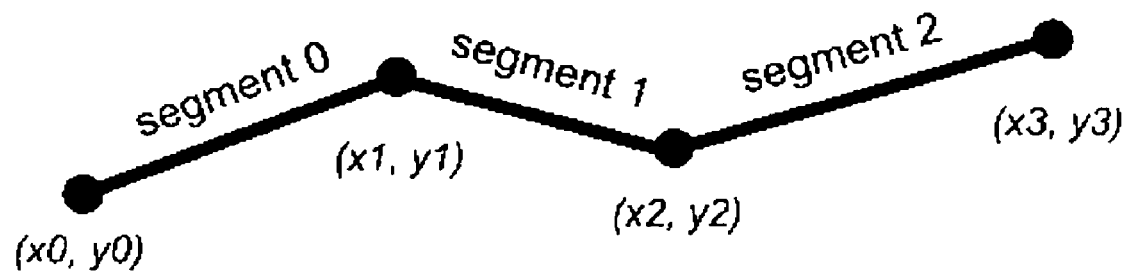
FIG. 14 illustrates a line in a guideline being piecewise approximated by end-to-end connected linear segments.
Figure 15:
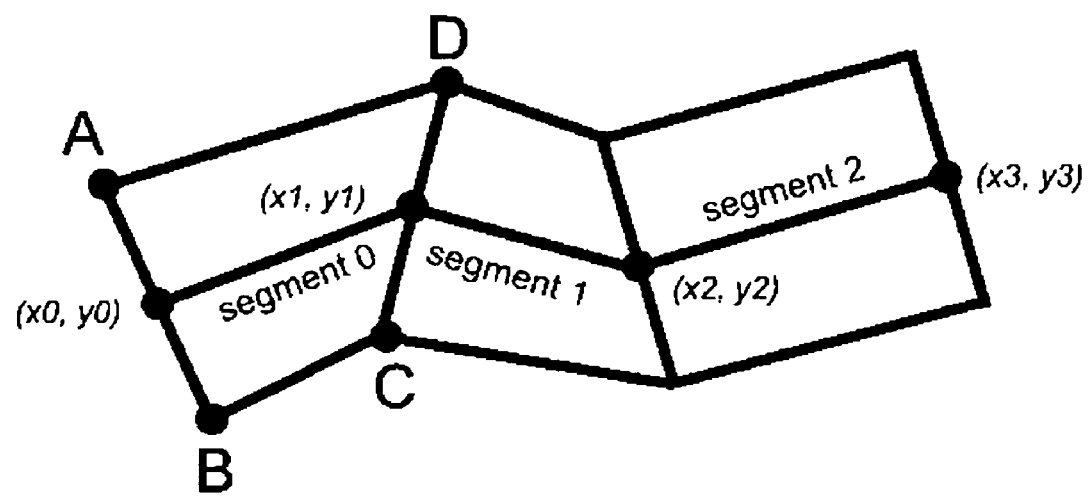
FIG. 15 illustrates the linear segments of FIG. 14 being used to create a sequence of quadilaterals.

At this point, the input guideline, which has at least one line, has been made piece-wise linear, as is shown in an exemplary manner in FIG. 14, such that no two adjacent pieces are at a sharp angle. This restriction is employed to allow construction of suitable polygons (step 104), that are, preferably, convex polygons. For instance, polygons may be generated by constructing the sides of a polygon using lines drawn at a specified angle to each of the linear segments generated from the guideline. FIG. 15 illustrates such a construction relative to the line segments of FIG. 14. In FIG. 15, a polygon corresponding to line segment 0 is formed by the perimeter ABCD marked by corners A, B, C and D. Thus, in an embodiment the left endpoint of a linear segment may be used to draw a line segment normal to the linear segment having a total length equal to the desired brush thickness. This normal segment can serve as the right and the left boundaries of adjacent quads. In the case of a closed path the case is simple since there are no segments without flanking edges. If the guideline does not describe a closed path then an additional side is generated for a segment at one of the ends of the guideline to complete the definition of the quads along the guideline. It should be noted that there is no requirement that the sides of the polygons be generated by lines that are normal to a line segment of interest. Instead, a line at a specified angle to the line segment of interest is adequate to generate a desired side.

Figure 16:
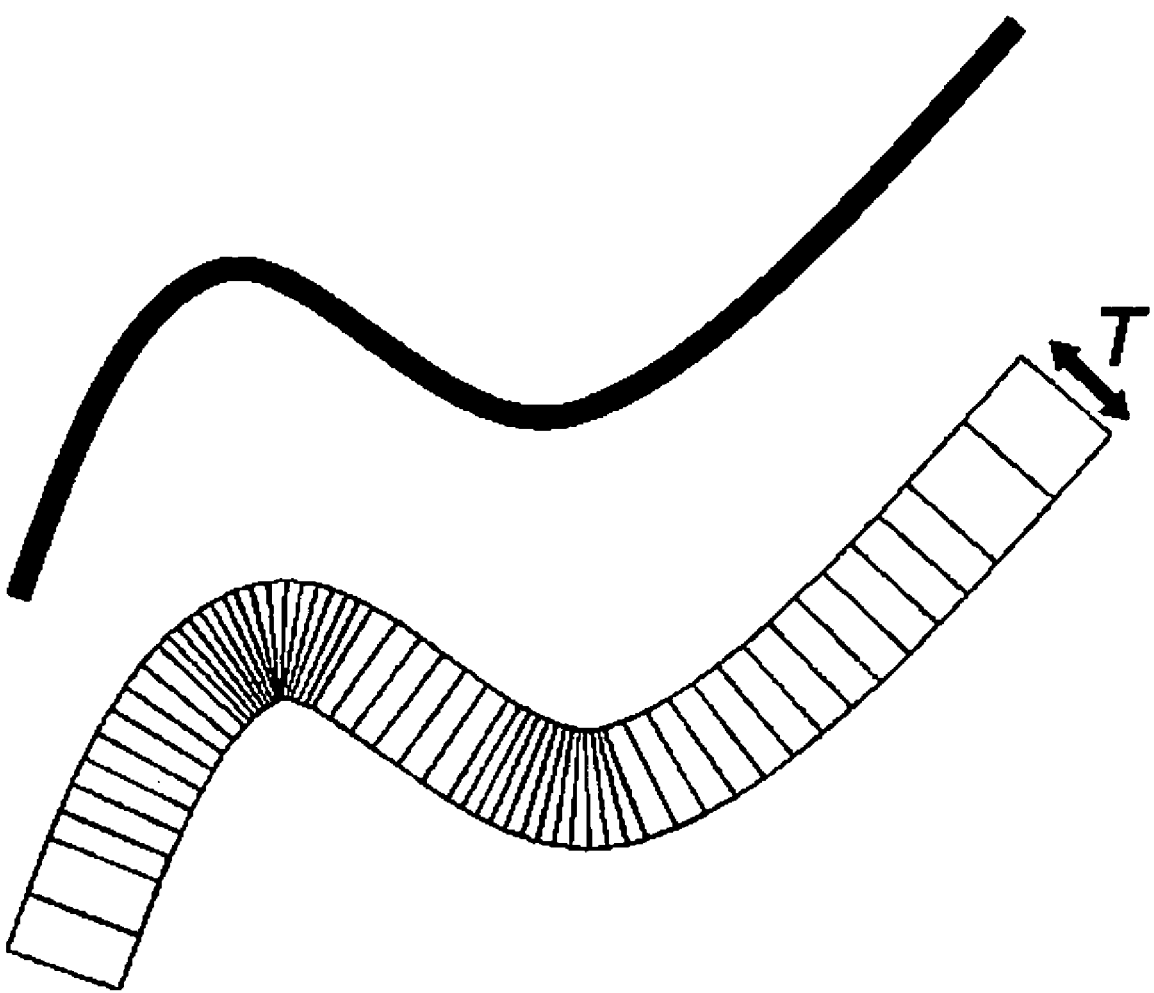
FIG. 16 illustrates a more extensive set of polygons corresponding to a guideline having a constant thickness.

Conveniently, the sum of the length of the linear segments generated from the guideline may be used to proportionally divide the bitmap brush along its length into rectangular segments, each of which is mapped to a corresponding polygon. FIG. 16 illustrates an example of polygons generated in this manner. Preferably, this mapping results in assigning coordinates in the bitmap brush to the vertices of the polygons (step 106). Advantageously, when more than one line is included in the guideline to specify the thickness of the brush stroke, one of the lines is chosen consistently to estimate the length of the linear segments.

At this stage the last step 108 is carried out to render a warped brush stroke by mapping the pixels in a segment of the bitmap brush into a corresponding polygon. Advantageously, the number of linear segments determine the number of polygons created, and hence the number of corresponding segments of the bitmap brush that are mapped into the polygons.

Figure 17:
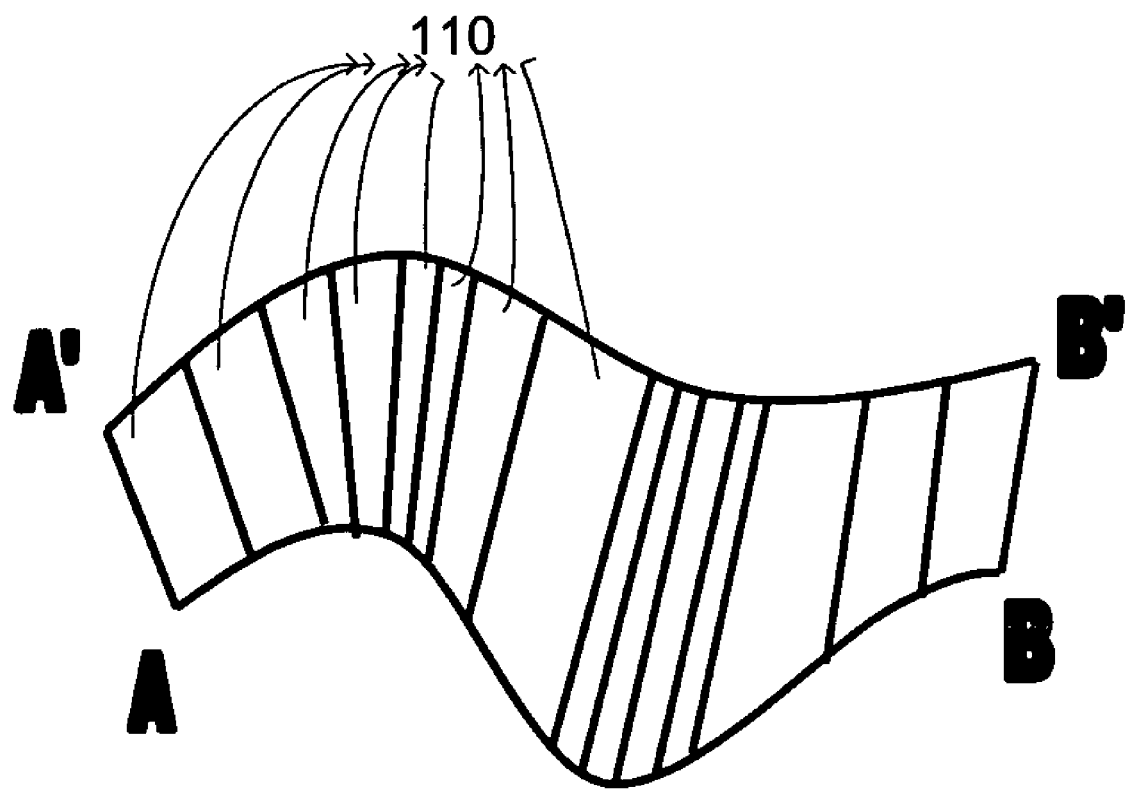
FIG. 17 illustrates a set of polygons corresponding to a guideline specified by two lines to specify variable thickness for a brush stroke along the stroke.

FIG. 17 illustrates the use of additional inputs to specify a varying thickness of a brush stroke. The use of polygons in the manner illustrated in FIGS. 13 and 16 makes this an attractive enhancement. The height of the brush stroke is constant in many of the embodiments described so far. This is not intended to be a limitation on the scope of the invention. For instance, use of a pressure sensitive device, e.g., a pressure sensitive graphics tablet, provides an input that may be used to vary the length of the lines defining the sides of a polygon. Similarly, the pressure input may also be utilized to modulate the opacity of the brush stroke during compositing the brush image with the underlying background image. In FIG. 17 line A'B' is at a variable distance from line AB where lines A'B' and AB together specify the path of a brush stroke and the separation between them specifies the thickness of the brush stroke. FIG. 17 also shows some polygons 110 generated using piece-wise continuous segments of lines A'B' and AB as the top and bottom segments of the polygons 110.

Figure 18:
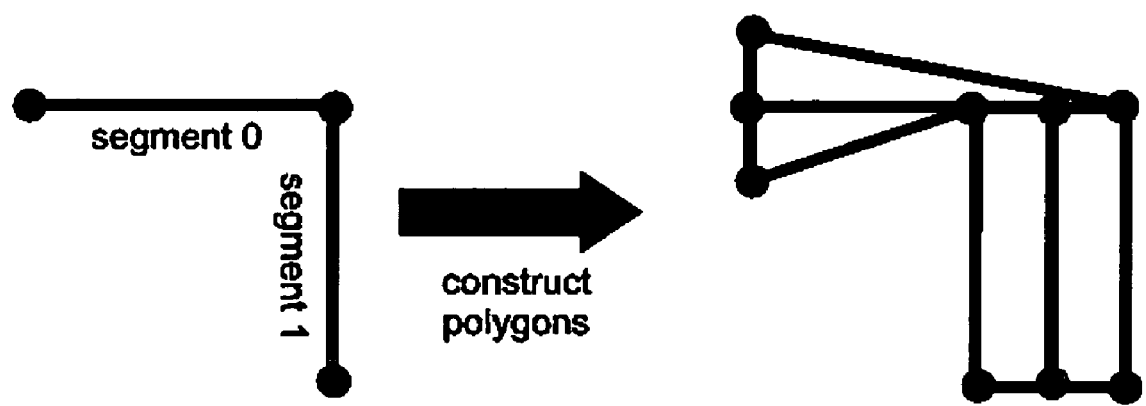
FIG. 18 illustrates the problem posed by sharp corners for constructing polygons.
Figure 19:
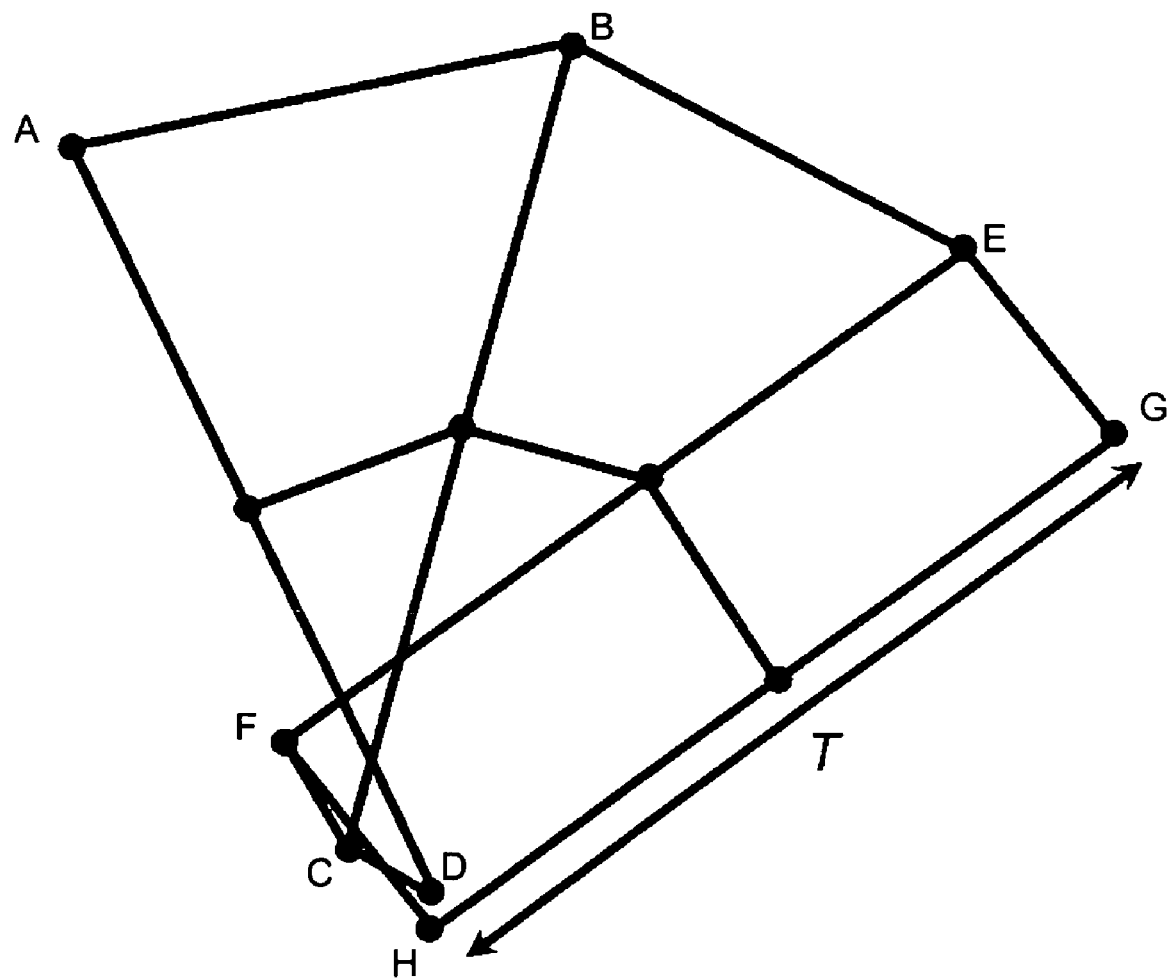
FIG. 19 illustrates the problem posed by overlapping polygons at a sharp turn in the guideline.
Figure 20:
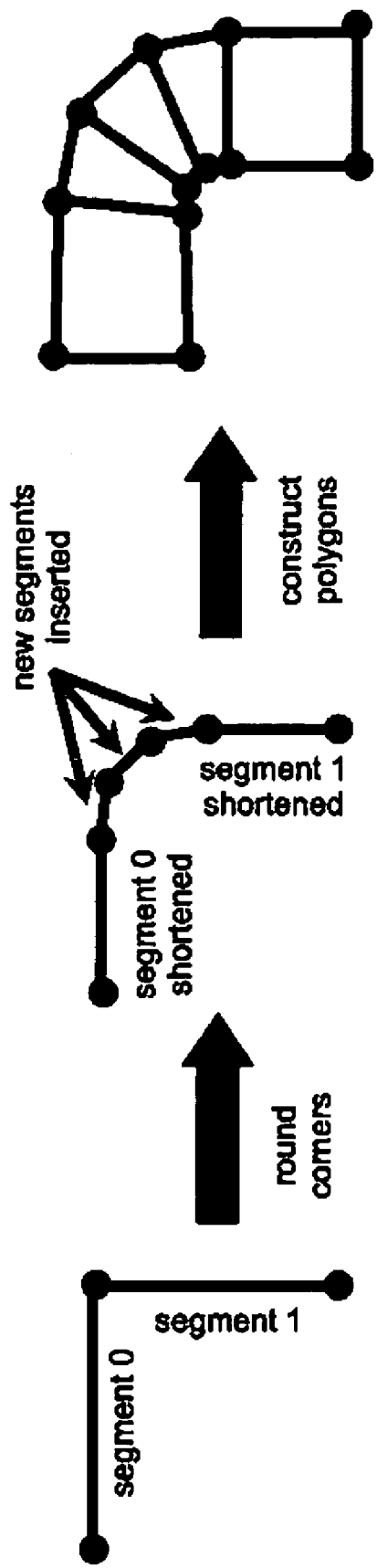
FIG. 20 is an illustration of a smoothing out of the sharp corner illustrated in FIG. 18.

FIGS. 18 and 19 illustrate some potential problems in rendering a warped brush stroke having sharp curves. Specifically, in portions of the guideline with a small radius of curvature, adjacent quads, or polygons, may lead to distorted polygons (FIG. 18) or overlap (FIG. 19). Overlaps, such as the ones illustrated in FIG. 19 between polygons ABCD, CBEF and EFHG are likely to be significant when the radius of curvature is larger than the thickness of the brush stroke. Sharp curves shown in FIG. 18 can be handled in the manner illustrated in FIG. 20, i.e., by inserting additional linear segments such that adjacent line segments do not create sharp corners. The inserted segments are, then, used to generate polygons. In addition to this approach, one may represent a corner by a join treated as a miter, bevel or round. Thus, it may be possible to define a side of a polygon by a line segment in a line dividing, although not necessarily bisecting, the angle between lines drawn at the prescribed angle to the appropriate segment defining the sharp corner. A sharp corner may also be treated as a round, which then can be replaced with a set of linear segments to yield a construct similar to FIG. 20.

Figure 21:
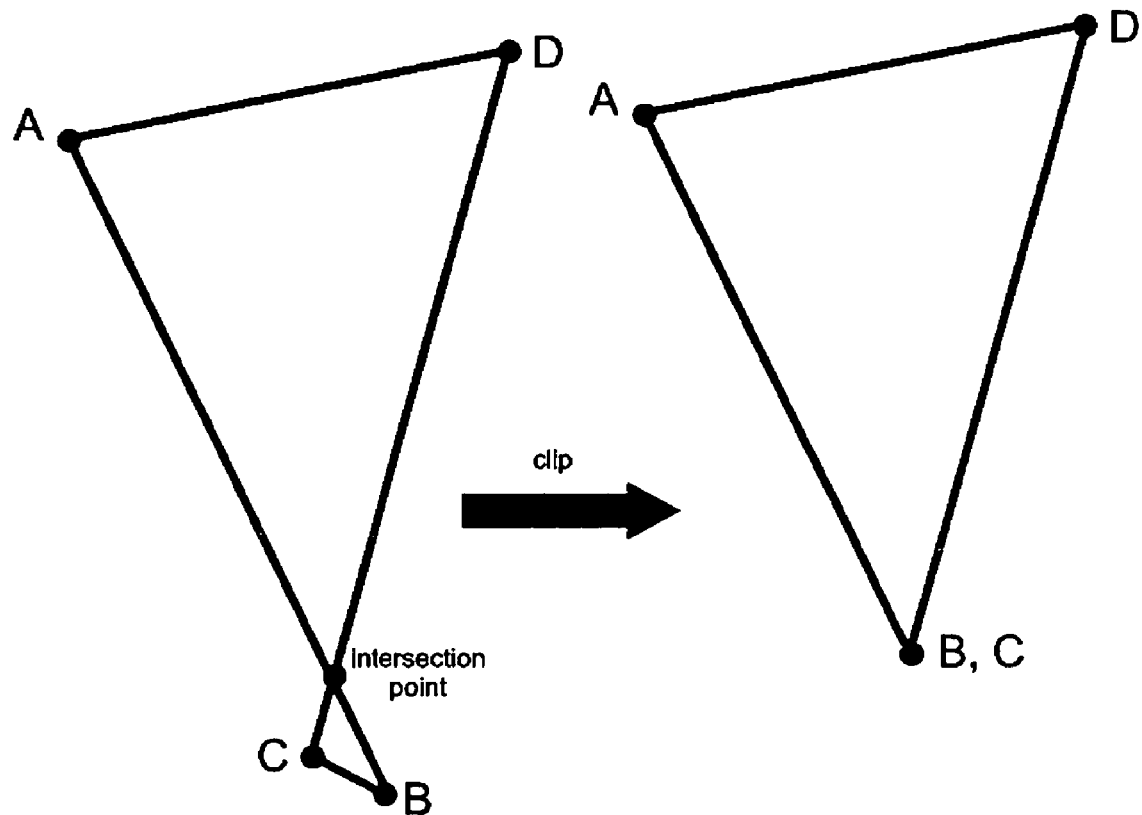
FIG. 21 illustrates a truncation strategy for handling overlapping polygons at sharp turns in the guideline.

It has been observed that for well-behaved sharp curves, quads at the corner/sharp curve overlap such that their sides intersect at a point determined from the radius of curvature, as is shown in FIG. 21. Thus, the overlap illustrated in FIG. 19 can be addressed in accordance with FIG. 21 to ensure that the warped brush stroke remains pleasing and continuous in its appearance. It is preferred that the corresponding segments of the bitmap brush image be proportionally truncated to enhance perceived the continuity of the warped brush stroke. Consequently, in such cases it may also be possible to speed up the process of rendering the warped brush stroke by truncating the portion of the quads below (or above) the point of intersection since there are fewer pixels in the warped brush stroke to process.

In addition to these approaches, it is possible to define a side of a polygon by a line segment in a line drawn to divide, although not necessarily bisect, the angle between adjacent line segments obtained by making a piece-wise linear approximation to a guideline. This approach generates non-overlapping adjacent polygons even at sharp corners in light of the fact that the line segments intersect at the radius of curvature for the sharp corner and the line segment may be truncated as described above. Furthermore, these line segments result in evenly warped brush strokes at the corners. It is noteworthy that this method of generating sides of a polygon is not restricted to sharp bends or corners, and instead, may be used between any pair of linear segments that are close together following the generation of the piece-wise linear approximation to the guideline.

Figure 22:
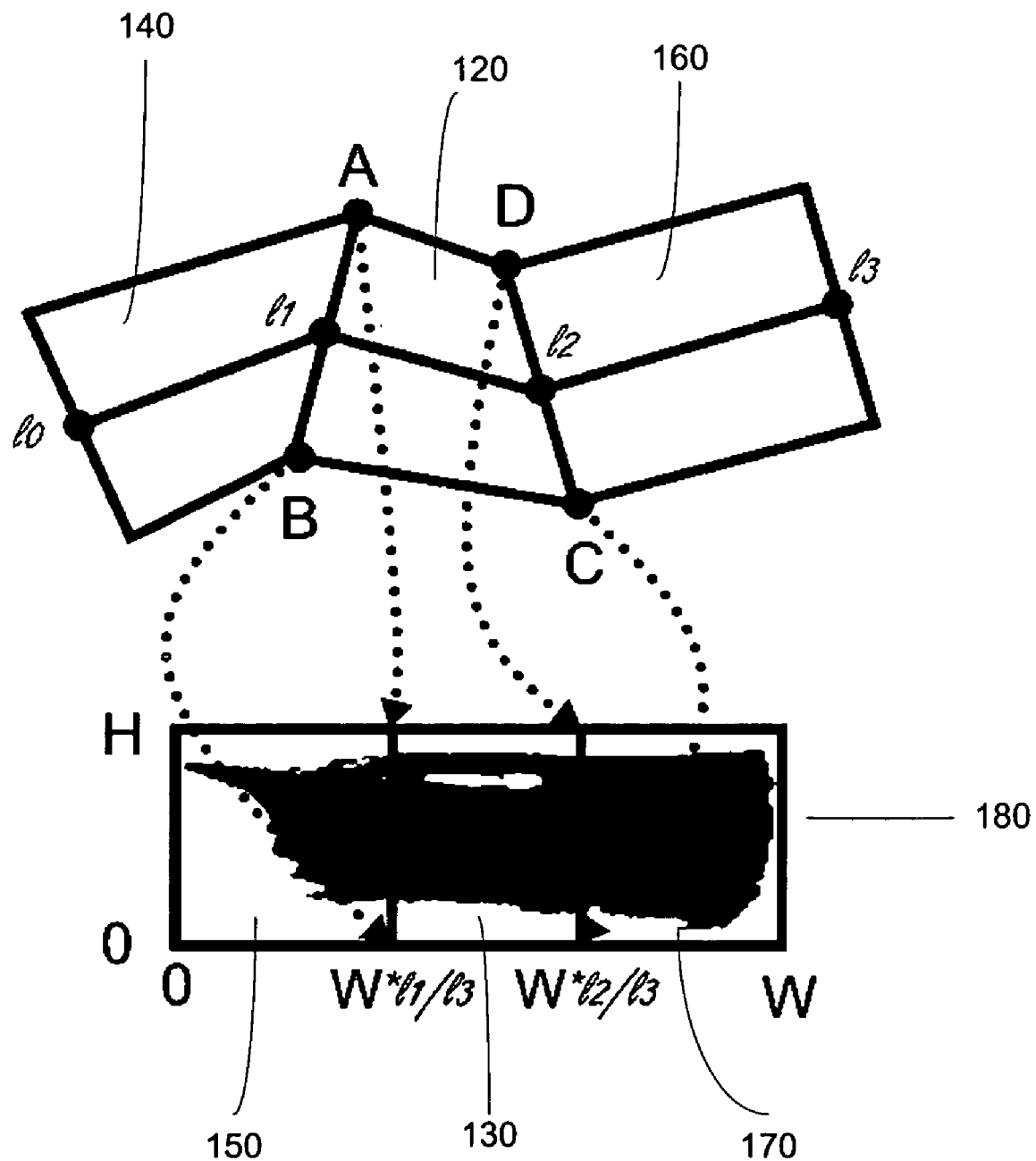
FIG. 22 is an illustration of the mapping of polygons corresponding to a guideline and a sequence of corresponding segments in a bitmap brush.

With the generation of the polygons, e.g., quads, for each of the linear segments generated from the guideline, a mapping is made to portions of the bitmap brush such that a fraction of the bitmap brush image maps to a particular polygon. One such mapping is shown in FIG. 22 where the polygon 120 defined by perimeter ABCD maps to the middle segment 130 of the bitmap brush 180. Advantageously, adjacent bitmap brush fractions map to adjacent polygons.

Many mapping strategies are possible that range from visiting each pixel in the segment of the bitmap brush to those that use interpolation or other computational strategies to generate the pixels in the corresponding polygon. Notably, these strategies do not require visiting any pixel in the warped brush stroke more than once. Some examples of such mapping are bilinear mapping and texture mapping. While many additional approaches and variations are possible, bilinear and texture mapping are described further by way of providing examples.

The bilinear transform maps a brush segment into a corresponding polygon having four corners, i.e., a quad, such that the brush segment corners map into corresponding polygon corners and the brush segment edges/sides map into polygon edges/sides. However, diagonals in the brush segment need not be preserved as straight lines in the corresponding polygon. Bilinear transforms are also termed as "corner-pinning" transforms that preserve equispaced points along the edges but not diagonal lines. Thus, for a point in the bitmap brush segment described by (x, y), with x and y taking values in the interval [0,1], a pixel (u, v) in the corresponding quad defined by corners $(u_0, v_0)$, $(u_1, v_1)$, $(u_2, v_2)$ and $(U_3, V_3)$ may be computed, for instance, as follows:

$$u(x,y)=u_0+x(u_1-u_0)+y(u_3-u_0+x(u_2+u_0-u_1-u_3))$$

$$v(x,y)=v_0+y(v_3-v_0)+x(v_1-v_0+y(v_2+v_0-v_1-v_3))$$

Figure 23:
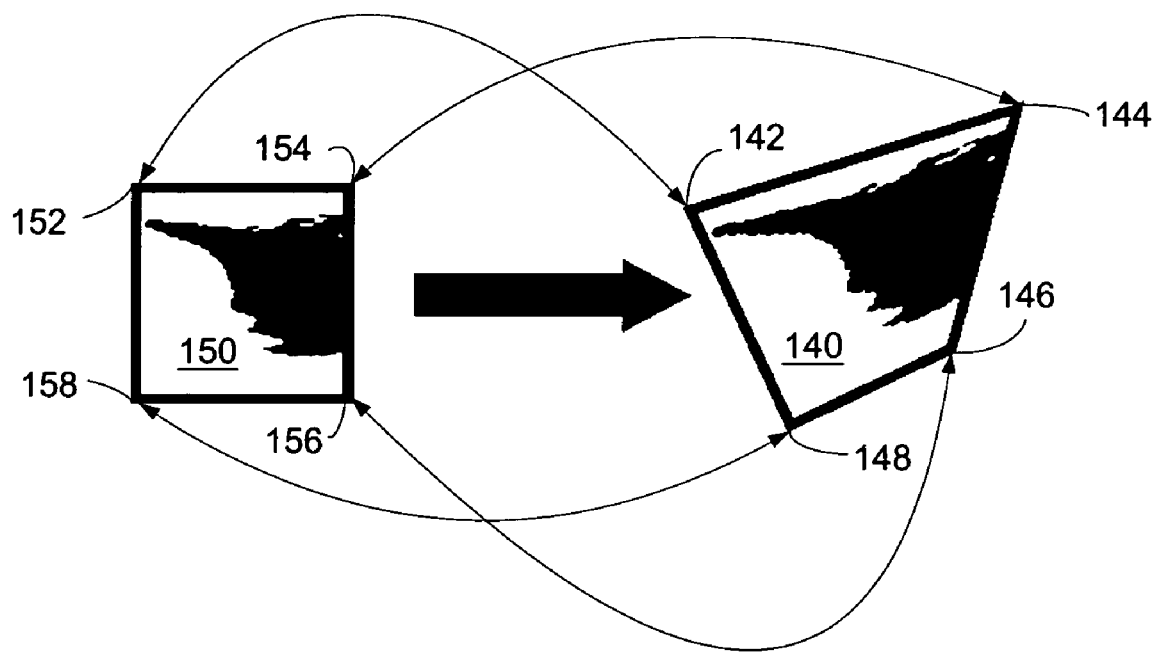
FIG. 23 illustrates the mapping from one segment of a bitmap brush to a polygon.

Unlike mapping from a rectangle to a quad, obtaining fractional values x and y when mapping from a quad to a rectangle includes the use of quadratics, and thus the possibility of multiple solutions. This can be seen by noting the presence of coefficients of xy in the equations above. Algorithms that address such complications are known and exemplary discussions can be found in, e.g., Roger Crane, "*A Simplified Approach To Image Processing*," Prentice-Hall, 1997. In contrast to the bilinear transform, texture mapping is even more flexible. FIG. 23 provides a possible example of texture mapping and bilinear mapping of a segment of a bitmap brush into a polygon. In FIG. 23 the bitmap brush segment 150 is used to fill the polygon 140 as illustrated in FIG. 22. Notably, in a bilinear transform, which is a special case of a texture map, corners 152, 154, 156 and 158 of bitmap brush segment 150 in FIG. 23 would map to corners 142, 144, 146 and 148 respectively. Texture mapping uses a more general approach.

Texture mapping is a relatively efficient way to provide complexity in an image without the tedium of rendering every detail of a surface. In our case, a segment of a bitmap brush is mapped into a polygon using texture mapping. Texture mapping can be performed by mapping from the texture space to a two or three dimensional space using linear or non-linear functions. Another mapping from the two or three dimensional space to the target space, in this case the polygon corresponding to the bitmap brush segment, completes the texture map. Further details of and variations on texture mapping are found in Paul S. Heckbert, "*Survey of Texture Mapping*," IEEE Computer Graphics and Applications, November 1986, pages 56–67.

Figure 24:
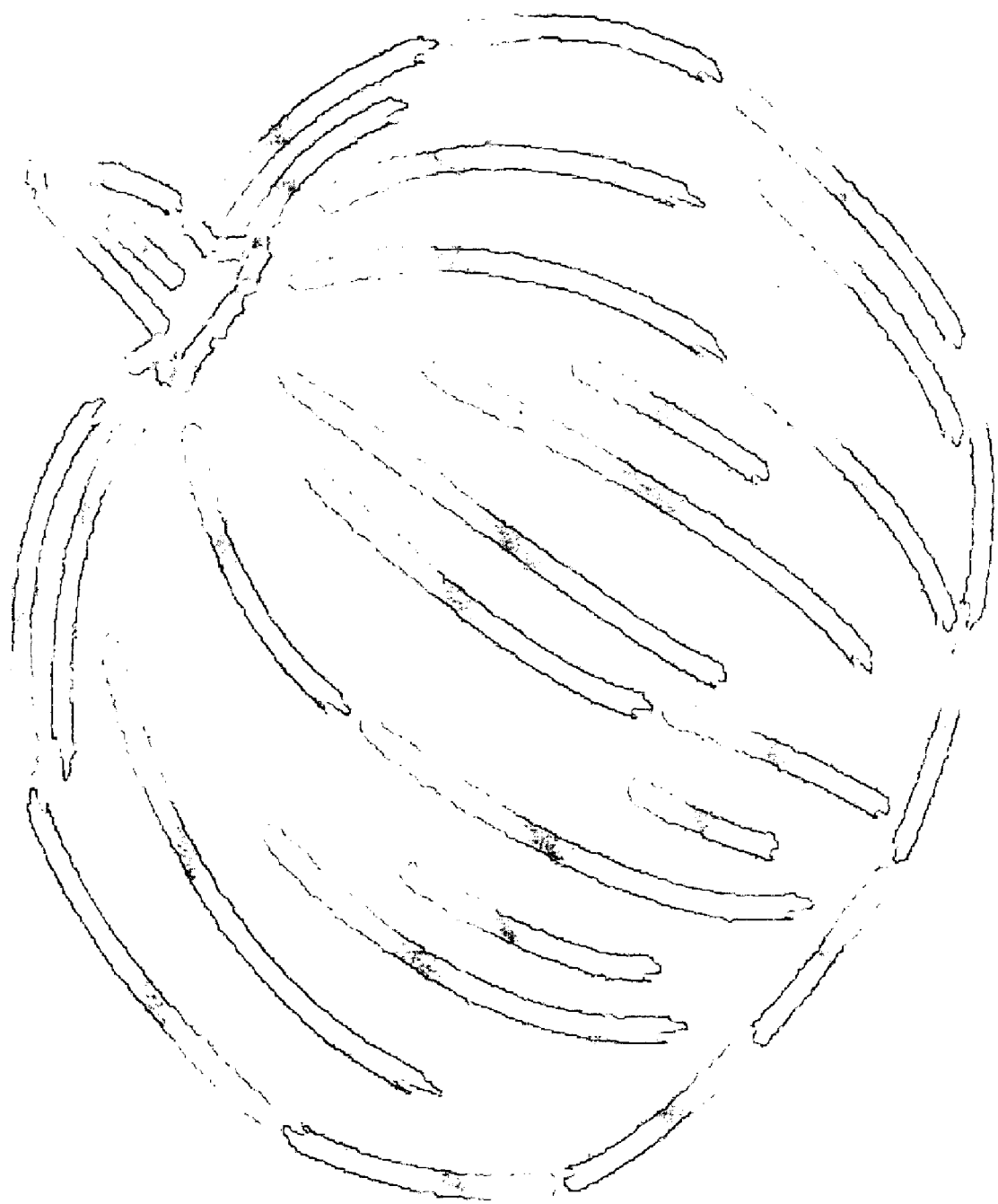
FIG. 24 is an illustration of warped brush strokes applied to a clip art image.
Figure 25:
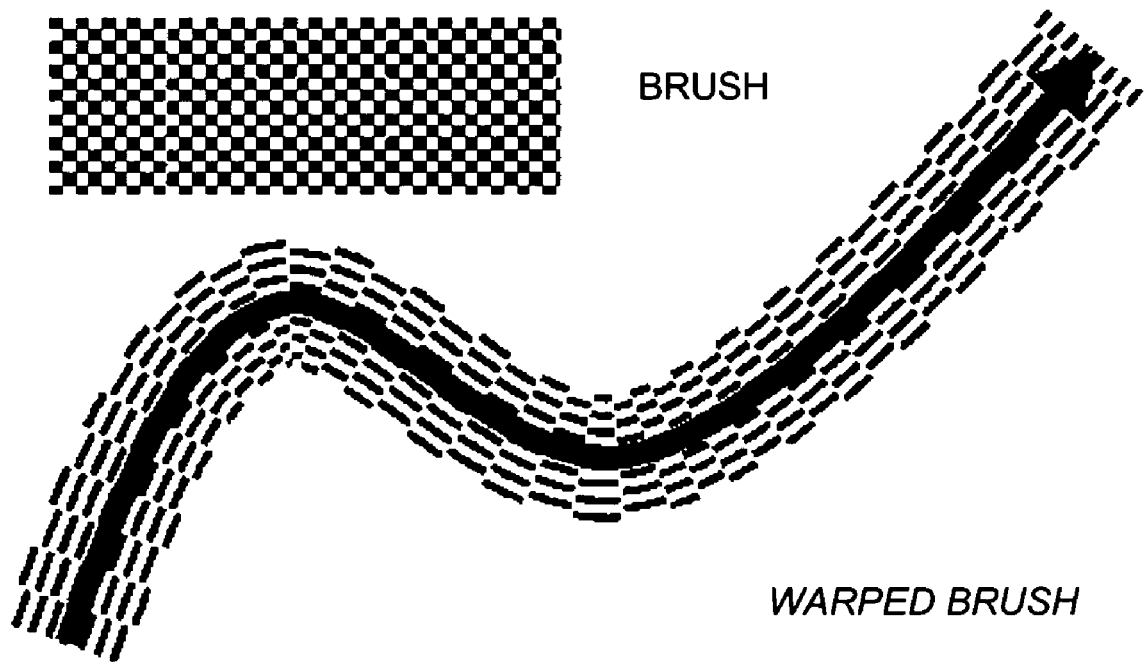
FIG. 25 is an illustration of a "checker board" bitmap brush before and after being mapped to a guideline.

As will be appreciated, the subject invention has the advantage of producing highly realistic artistic or photo stroke images. Among other things, this realism is accomplished by the aforementioned methods which particularly provide for the axial compression of the bitmap brush on the concave side and the axial stretching of the bitmap brush on the convex side when rendering the paint stroke. This is illustrated in FIGS. 24 and 25 for a "line" drawing and a "checkered" bitmap brush respectively.

Figure 26:
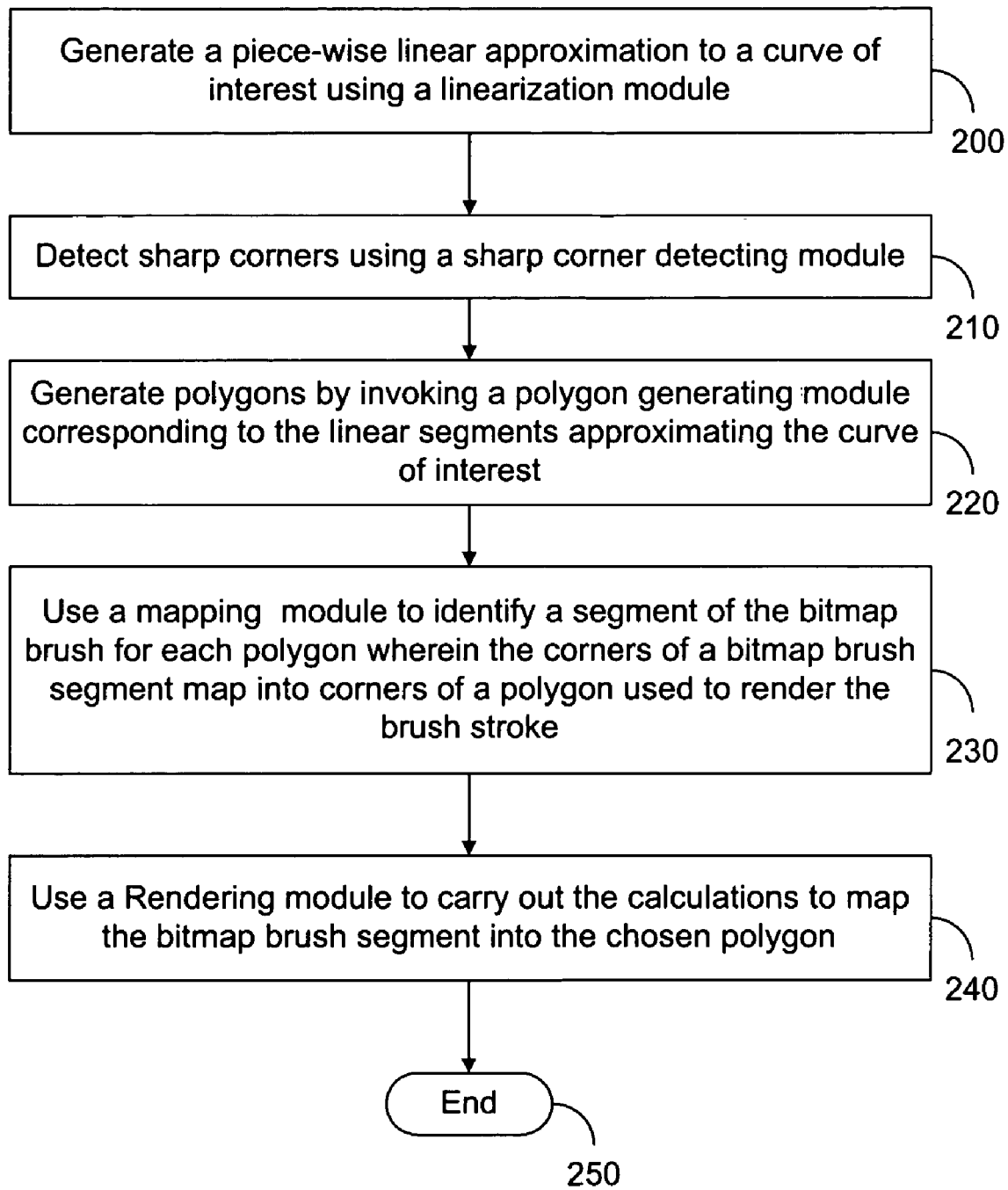
FIG. 26 illustrates a possible system and method in accordance with the invention.

FIG. 26 provides an illustration of a method and a system in accordance with an embodiment of the invention. A linearization module is used to generate a piece-wise linear approximation to a curved guideline in step 200. This first approximation is improved, for instance, in step 210 by using a sharp-corner-detecting module to flag sharp corners and, subsequently, adding linear segments to remove the sharp corners. Of course, in some embodiments, such corners may not be removed for artistic or other reasons. Thus, such removal is not necessary, but merely a desirable operation. Polygons corresponding to the linear segments are generated in step 220 using a polygon-generating module. A default mapping or a mapping specified by a user, is used in a mapping module to identify and/or define segments in the bitmap brush corresponding to each of the polygons. Finally, a rendering module carries out the calculations and operations to actually output the warped brush stroke.

All of the references cited herein, including patents, patent applications, and publications, are hereby incorporated in their entireties by reference. In particular, patent application Ser. No. 09/224,237, assigned to the assignee of this application, is incorporated by reference in its entirety.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of drawing a brush stroke with a bitmap brush, the bitmap brush comprising a bitmap image having pixels, the brush stroke rendered relative to a guideline, the guideline specifying an arbitrary path for the brush stroke, the method implemented by a computing device and comprising:
    determining a first polygon on the guideline; determining a first segment in the bitmap brush corresponding to the first polygon on the guideline, the first segment in the bitmap brush comprising a first portion of the bitmap image; applying a first transformation to the first portion of the bitmap image mapped in the first segment in the bitmap brush to generate a corresponding bitmap image in the first polygon on the guideline to create a first segment of the brush stroke; and displaying the first segment of the brush stroke on a display device.

2. The method of claim 1 wherein the step of determining the first polygon comprises:
    making a piece-wise linear approximation of the curved guideline, the piece-wise approximation having a plurality of line segments that are connected end to end; generating sides of the first polygon at a first line segment in the plurality of line segments, by drawing lines of specified length at the endpoints of the first line segment at least at one specified angle to the first line segment; and connecting the ends of the lines of specified length to complete the first polygon.

3. The method of claim 2 wherein the step of generating sides of the first polygon comprises:
    generating a first side at a specified angle to a first line segment in the plurality of line segments, the first side having two first endpoints defining a length corresponding to a first desired thickness of the brush stroke at one end of the first line segment; generating a second side at the specified angle to a second line segment in the plurality of line segments, and wherein the first line segment is adjacent to the second line segment, the second side having two second endpoints defining a length corresponding to a second desired thickness of the brush stroke at one end of the second line segment; and defining a first polygon having corners defined by the two first endpoints and the two second endpoints.

4. The method of claim 2 wherein the step of generating sides of the first polygon comprises:
    generating a first side, the first side having two first endpoints defining a length corresponding to a first desired thickness of the brush stroke at one end of the first line segment, wherein, furthermore, the first side dividing the angle between the first line segment in the guideline and an adjacent second line segment in the guideline; generating a second side, the second side having two second endpoints defining a length corresponding to a second desired thickness of the brush stroke at one end of the second line segment, wherein, furthermore, the second side dividing the angle between the second line segment in the guideline and an adjacent third line segment in the guideline; and defining a polygon having corners defined by the two first endpoints and the two second endpoints.

5. The method of claim 4 wherein the first side bisects the angle between the first line segment in the guideline and the adjacent second line segment in the guideline.

6. The method of claim 1 wherein the guideline forms a closed loop.

7. The method of claim 1 wherein the first transformation is a bilinear transformation.

8. The method of claim 7 wherein one of corner points of the first polygon is used to generate at least one parameter for the bilinear transformation.

9. The method of claim 1 wherein the first transformation is a texture mapping.

10. The method of claim 1 wherein a desired thickness for the brush stroke at a point on the curved guideline corresponds to a separation between a first line and a second line in the guideline.

11. The method of claim 2 wherein the step of making a piece-wise linear approximation of the guideline comprises:
    selecting one of the lines in the guideline; and generating end to end connected linear segments, each of the linear segments approximating a segment of the selected line in the guideline.

12. The method of claim 11 wherein the step of generating end-to-end connected linear segments further includes dividing a linear segment into additional end-to-end connected linear segments in response to a user selection.

13. The method of claim 11 wherein the guideline has two lines specifying the thickness of the brush stroke, wherein furthermore the step of determining a first polygon comprises selecting a segment in one of the lines specifying the thickness of the brush stroke, and selecting another line segment in another of the lines specifying the thickness of the brush stroke; and connecting ends of the selected line segments with straight lines to form the first polygon such that the first polygon is a convex polygon.

14. The method of claim 11 wherein the guideline has two lines specifying the thickness of the brush stroke, wherein furthermore the step of determining a first polygon comprises: selecting a line segment in one of the lines specifying the thickness of the brush stroke, and selecting a point in another of the lines specifying the thickness of the brush stroke; and connecting ends of the selected line segment with straight lines to the selected point to form the first polygon such that the first polygon is a convex polygon.

15. The method of claim 11 wherein the step of generating end-to-end connected linear segments for one of the lines in the guideline further includes adding a linear segment adjacent to another linear segment at an angle greater than a specified corner threshold.

16. The method of claim 11 wherein the step of generating end-to-end connected linear segments for one of the lines in the guideline further includes replacing a sharp curve, the sharp curve defined by two adjacent linear segments making an angle with each other of less than a specified corner threshold, by a rounded corner prior to generating end-to-end connected linear segments.

17. The method of claim 2 wherein the step of generating the first polygon includes truncating a portion of the first polygon overlapping with a second polygon to generate a first convex polygon and a second convex polygon.

18. The method of claim 17 wherein the step of applying the first transformation uses a modified first segment in the bitmap brush, the modified first segment having proportionally reduced brush thickness to correspond to the first convex polygon, to generate a corresponding image in the first convex polygon.

19. A computer-readable storage medium having a tangible component and having computer-executable instructions embodied thereon for causing a computing device to perform a method for drawing a brush stroke with a bitmap brush, the bitmap brush comprising a bitmap image having pixels, the brush stroke rendered relative to a guideline, the guideline specifying an arbitrary path for the brush stroke, the method comprising:
determining a first polygon on the guideline; determining a first segment in the bitmap brush corresponding to the first polygon on the guideline, the first segment in the bitmap brush comprising a first portion of the bitmap image; applying a first transformation to the first portion of the bitmap image mapped in the first segment in the bitmap brush to generate a corresponding bitmap image in the first polygon on the guideline to create a first segment of the brush stroke; and displaying the first segment of the brush stroke on a display device.

20. The computer-readable medium as in claim 19, wherein the step of determining the first polygon comprises:
making a piece-wise linear approximation of the curved guideline, the piece-wise approximation having a plurality of line segments that are connected end to end; generating sides of the first polygon at a first line segment in the plurality of line segments by drawing lines of specified length at the endpoints of the first line segment at least one specified angle to the first line segment; and connecting the ends of the lines to complete the first polygon.

21. The computer-readable medium as in claim 19, wherein the step of generating sides of the first polygon comprises:
generating a first side at a specified angle to a first line segment in the plurality of line segments, the first side having two first endpoints defining a length corresponding to a first desired thickness of the brush stroke at one end of the first line segment;
generating a second side at the specified angle to a second line segment in the plurality of line segments, and wherein the first line segment is adjacent to the second line segment, the second side having two second endpoints defining a length corresponding to a second desired thickness of the brush stroke at one end of the second line segment; and
defining a first polygon having corners defined by the two first endpoints and the two second endpoints.

22. The computer-readable medium as in claim 19, wherein the step of generating sides of the first polygon comprises:
generating a first side, the first side having two first endpoints defining a length corresponding to a first desired thickness of the brush stroke at one end of the first line segment, wherein, furthermore, the first side dividing the angle between the first line segment in the guideline and an adjacent second line segment in the guideline;
generating a second side, the second side having two second endpoints defining a length corresponding to a second desired thickness of the brush stroke at one end of the second line segment, wherein, furthermore, the second side dividing the angle between the second line segment in the guideline and an adjacent third line segment in the guideline; and
defining a polygon having corners defined by the two first endpoints and the two second endpoints.

23. The computer-readable medium as in claim 22, wherein the first side bisects the angle between the first line segment in the guideline and the adjacent second line segment in the guideline.

24. The computer-readable medium as in claim 19 wherein the guideline forms a closed loop.

25. The computer-readable medium as in claim 19 wherein the first transformation is a bilinear transformation.

26. The computer-readable medium as in claim 25 wherein one of corner points of the first polygon is used to generate at least one parameter for the bilinear transformation.

27. The computer-readable medium as in claim 19 wherein the first transformation is a texture mapping.

28. The computer-readable medium as in claim 19 wherein a desired thickness for the brush stroke at a point on the curved guideline corresponds to a separation between a first line and a second line in the guideline.

29. The computer-readable medium as in claim 20 wherein the step of making a piece-wise linear approximation of the guideline comprises:
selecting one of the lines in the guideline; and generating end to end connected linear segments, each of the linear segments approximating a segment of the selected line in the guideline.

30. The computer-readable medium as in claim 29 wherein the step of generating end-to-end connected linear segments further includes dividing a linear segment into additional end-to-end connected linear segments in response to a user selection.

31. The computer-readable medium as in claim 29, wherein the step of generating end-to-end connected linear segments for one of the lines in the guideline, the guideline having two or more lines wherein the separation between the lines corresponds to a desired thickness of the brush stroke, further includes dividing a linear segment into additional end-to-end connected linear segments if the change in the separation between the two lines over the linear segment is greater that a specified thickness threshold.

32. The computer-readable medium as in claim 29 wherein the guideline has two lines specifying the thickness of the brush stroke, wherein furthermore the step of determining a first polygon comprises selecting a line segment in one of the lines specifying the thickness of the brush stroke, and selecting another line segment in another of the lines specifying the thickness of the brush stroke; and connecting ends of the selected line segments with straight lines to form the first polygon such that the first polygon is a convex polygon.

33. The computer-readable medium as in claim 29 wherein the guideline has two lines specifying the thickness of the brush stroke, wherein furthermore the step of determining a first polygon comprises: selecting a line segment in one of the lines specifying the thickness of the brush stroke, and selecting a point in another of the lines specifying the thickness of the brush stroke; and connecting ends of the selected line segment with straight lines to the selected point to form the first polygon such that the first polygon is a convex polygon.

34. The computer-readable medium as in claim 29 wherein the step of generating end-to-end connected linear segments for one of the lines in the guideline further includes adding a linear segment adjacent to another linear segment at an angle greater than a specified corner threshold.

35. The computer-readable medium as in claim 29, wherein the step of generating end-to-end connected linear segments for one of the lines in the guideline further includes replacing a sharp curve, the sharp curve defined by two adjacent linear segments making an angle with each other of less than a specified corner threshold, by a rounded corner prior to generating end-to-end connected linear segments.

36. The computer-readable medium as in claim 19, wherein the step of generating the first polygon includes truncating a portion of the first polygon overlapping with a second polygon to generate a first convex polygon and a second convex polygon.

37. The computer-readable medium as in claim 36, wherein the step of applying the first transformation uses a modified first segment in the bitmap brush, the modified first segment having proportionally reduced brush thickness to correspond to the first convex polygon, to generate a corresponding image in the first convex polygon.

38. A computerized system for rendering a warped brush stroke using a bitmap brush and a guideline, the bitmap brush comprising a bitmap image having pixels, the guideline specifying an arbitrary path for the brush stroke, the computerized system comprising one or more computer-readable storage media having one or more tangible components and having encoded thereon a plurality of modules, the plurality of modules comprising:

a linearization module for generating a plurality of line segments approximating a curved line representing the guideline; a sharp corner correcting module for detecting a corner defined by an angle between two adjacent line segments that is smaller than a corner threshold and adding line segments at angles greater than or equal to the corner threshold; a polygon generating module for generating a plurality of polygons corresponding to the plurality of line segments; a polygon corner identifying module for identifying corners of each polygon generated by the polygon generating module; a mapping module for identifying a plurality of segments of the bitmap brush corresponding to the plurality of polygons generated by the polygon generating module, each segment of the bitmap brush having corners corresponding to the corners of a respective polygon; and a rendering module for rendering the plurality of segments of the bitmap brush in the corresponding plurality of polygons to create the brush stroke and for displaying the brush stroke on a display device.

39. The system of claim 38 wherein the polygon corner identifying module identifies corners of a polygon by truncating overlaps between adjacent polygons to generate corners of a convex polygon.

\* \* \* \* \*